(12) United States Patent
Zhang et al.

(10) Patent No.: US 10,604,101 B2
(45) Date of Patent: Mar. 31, 2020

(54) AIRBAG APPARATUS

(71) Applicant: TOYODA GOSEI CO., LTD., Kiyosu-shi, Aichi-ken (JP)

(72) Inventors: Ning Zhang, Beverly Hills, MI (US); Shiro Ohara, Ypsilanti, MI (US); Aviral Shrivatri, Madison Heights, MI (US); Atsushi Kashio, Farmington Hills, MI (US); Michael Rhodes, Ste. Genevieve, MO (US)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 54 days.

(21) Appl. No.: 15/984,689

(22) Filed: May 21, 2018

(65) Prior Publication Data
US 2019/0351858 A1  Nov. 21, 2019

(51) Int. Cl.
*B60R 21/207* (2006.01)
*B60R 21/0132* (2006.01)
*B60R 21/2338* (2011.01)
*B60R 21/01* (2006.01)
*B60R 21/00* (2006.01)

(52) U.S. Cl.
CPC ........ *B60R 21/207* (2013.01); *B60R 21/0132* (2013.01); *B60R 21/2338* (2013.01); *B60R 2021/0004* (2013.01); *B60R 2021/01013* (2013.01)

(58) Field of Classification Search
CPC .............. B60R 21/207; B60R 21/0132; B60R 21/2338; B60R 2021/0004; B60R 2021/01013
See application file for complete search history.

(56) References Cited

U.S. PATENT DOCUMENTS

| | | | |
|---|---|---|---|
| 5,738,368 A * | 4/1998 | Hammond | B60N 2/68 280/730.1 |
| 5,782,529 A * | 7/1998 | Miller, III | B60R 21/207 280/730.1 |
| 6,390,549 B1 * | 5/2002 | Mayer | B60N 2/4228 297/216.14 |
| 2015/0091281 A1 * | 4/2015 | Nagasawa | B60N 2/4228 280/730.1 |
| 2015/0091282 A1 * | 4/2015 | Nagasawa | B60N 2/4228 280/730.1 |
| 2017/0129440 A1 * | 5/2017 | Nagasawa | B60N 2/4228 |
| 2017/0282759 A1 * | 10/2017 | Line | B60N 2/20 |

(Continued)

FOREIGN PATENT DOCUMENTS

DE    102 01 836 A1    8/2003

*Primary Examiner* — Darlene P Condra
(74) *Attorney, Agent, or Firm* — Posz Law Group, PLC

(57) ABSTRACT

An airbag apparatus includes an inflator, which generates inflation gas, and an airbag, which is supplied with the inflation gas from the inflator. The airbag is arranged in the seat back of a front seat. The airbag includes a lower inflation portion and an upper inflation portion. The lower inflation portion is inflated by the inflation gas only inside the lower part of the seat back. The upper inflation portion is arranged inside the seat back and above the lower inflation portion. The upper inflation portion is inflated above the lower inflation portion by the inflation gas, breaks the covering, which constitutes the outer shell of the seat back, and is inflated outside the seat back through the broken part of the covering.

10 Claims, 11 Drawing Sheets

(56) References Cited

U.S. PATENT DOCUMENTS

| | | | |
|---|---|---|---|
| 2017/0320460 A1* | 11/2017 | Roychoudhury | B60R 21/239 |
| 2018/0186325 A1* | 7/2018 | Jaradi | B60R 21/207 |
| 2018/0236962 A1* | 8/2018 | Ohno | B60R 21/207 |

* cited by examiner

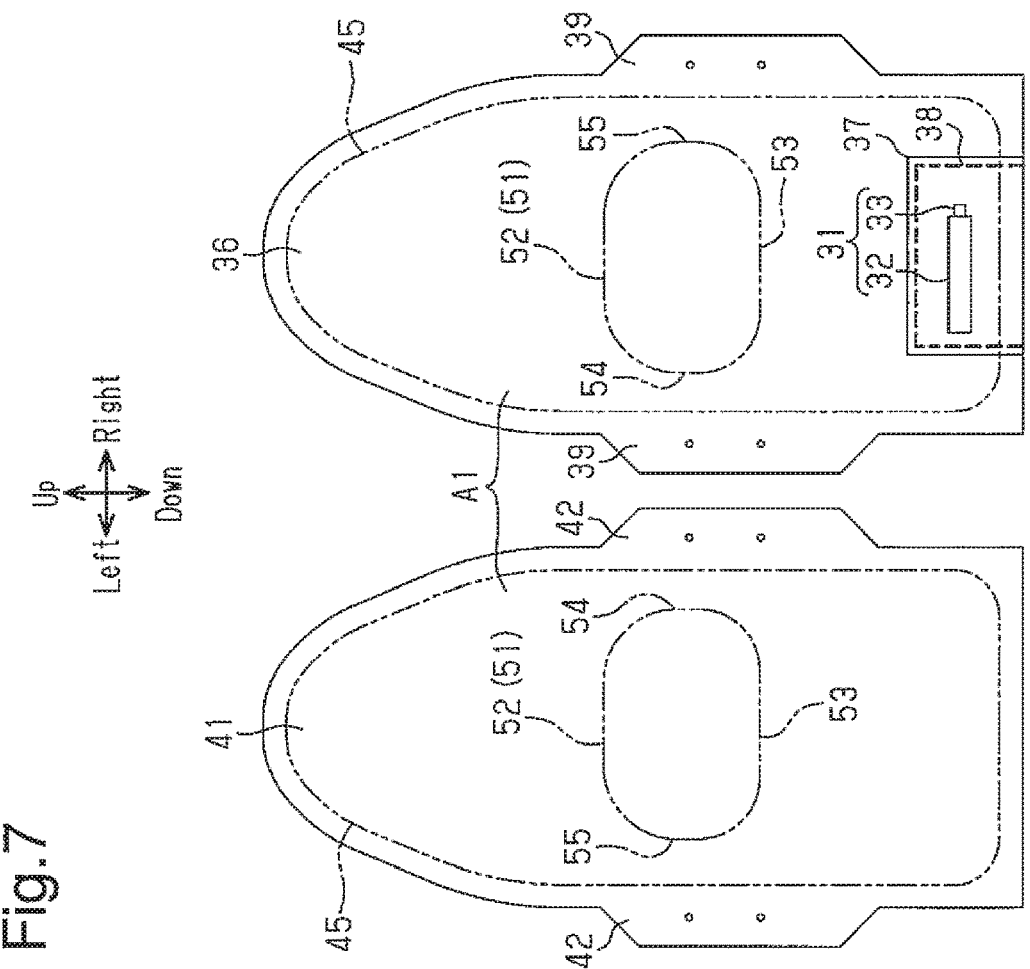
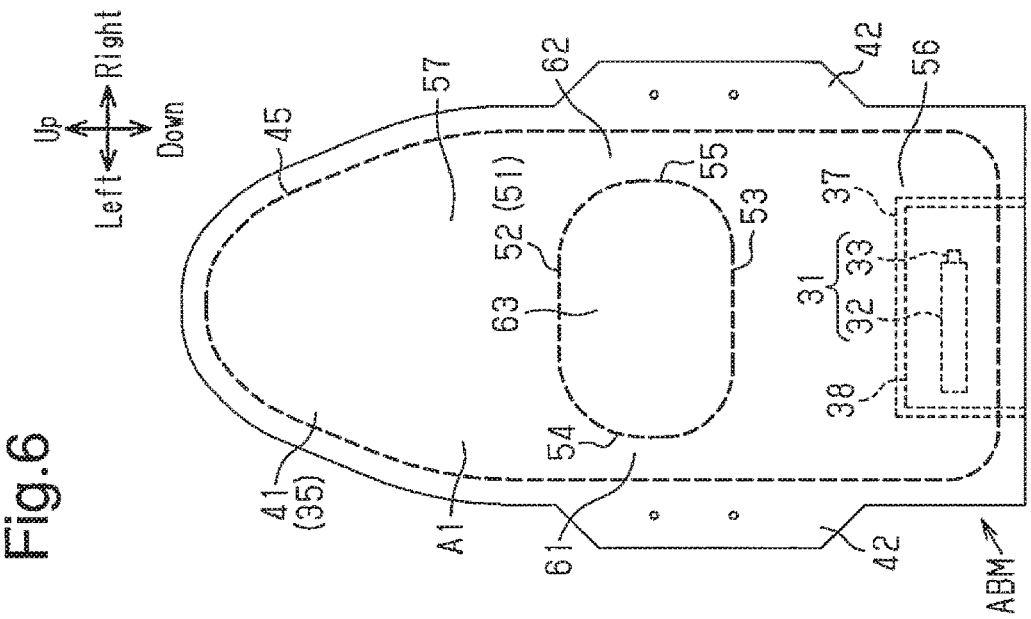

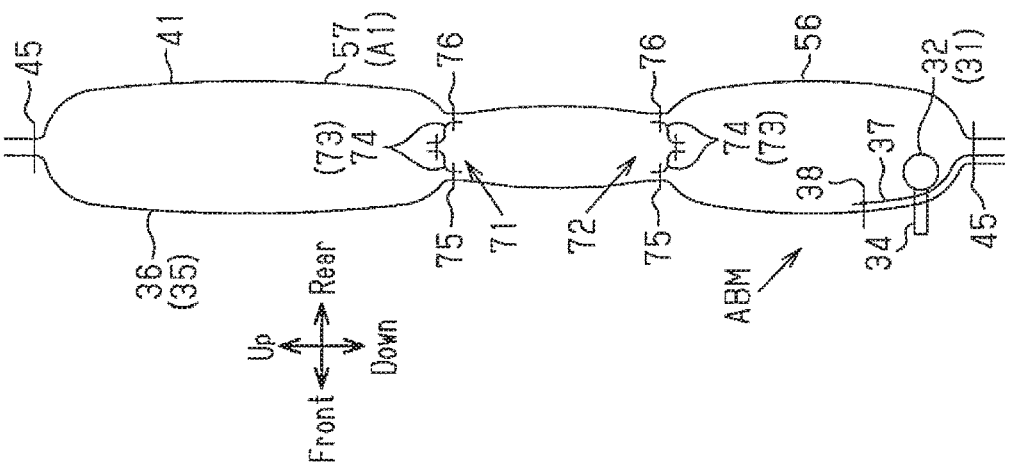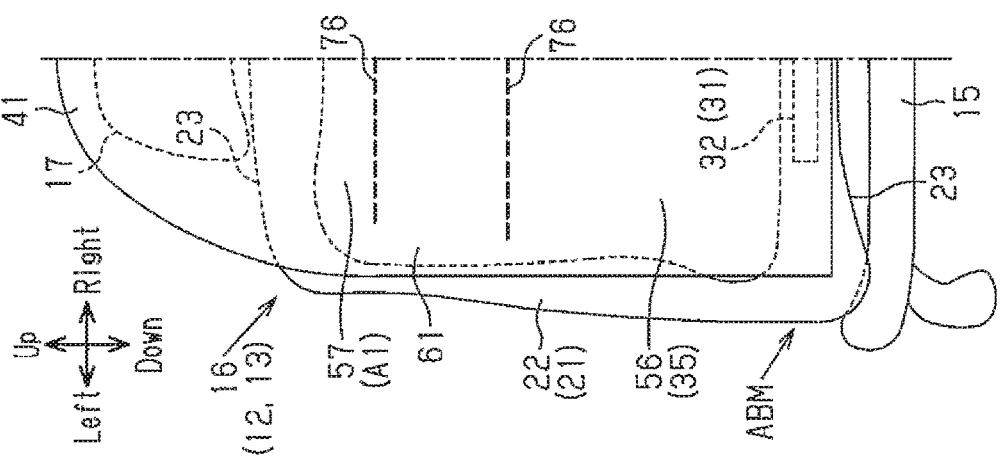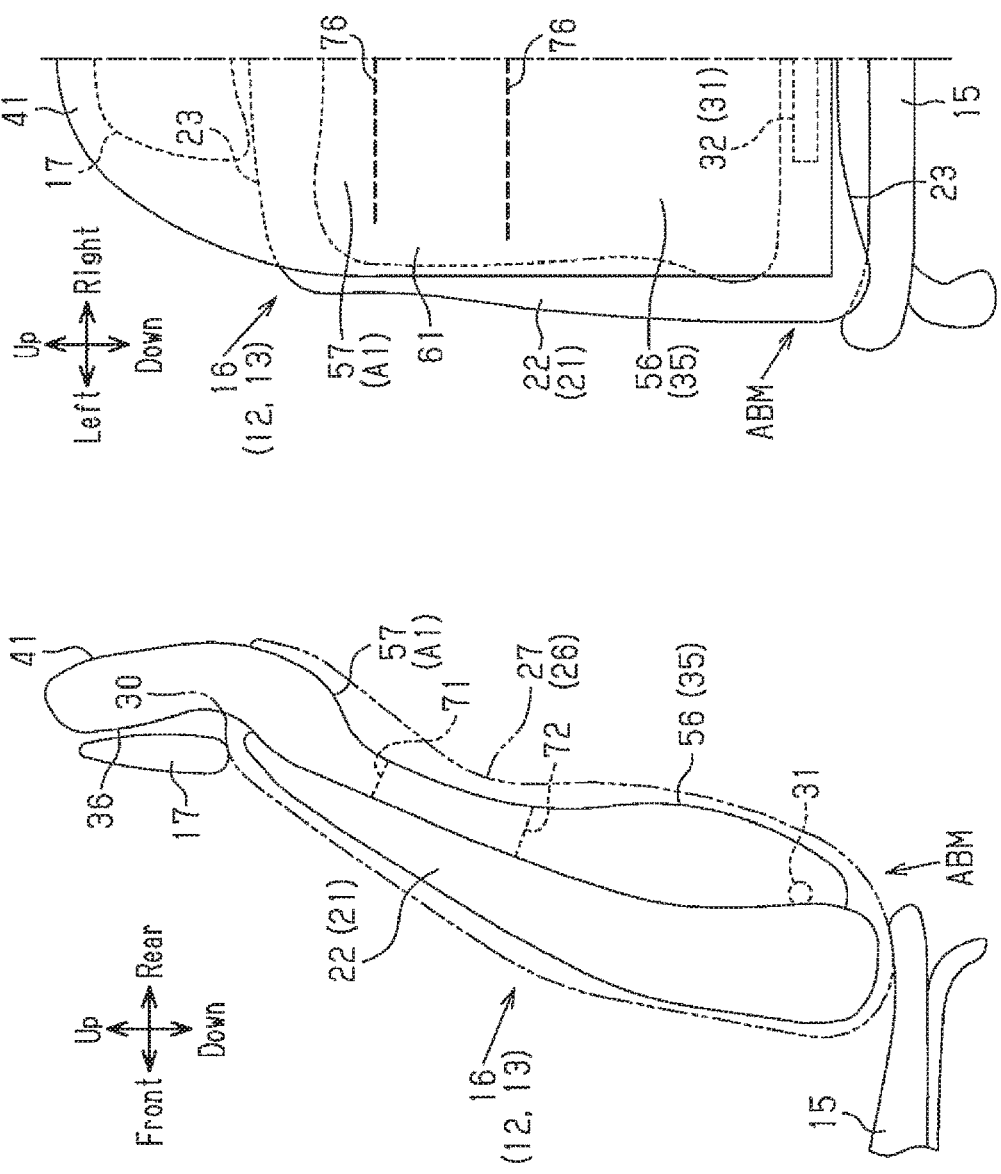

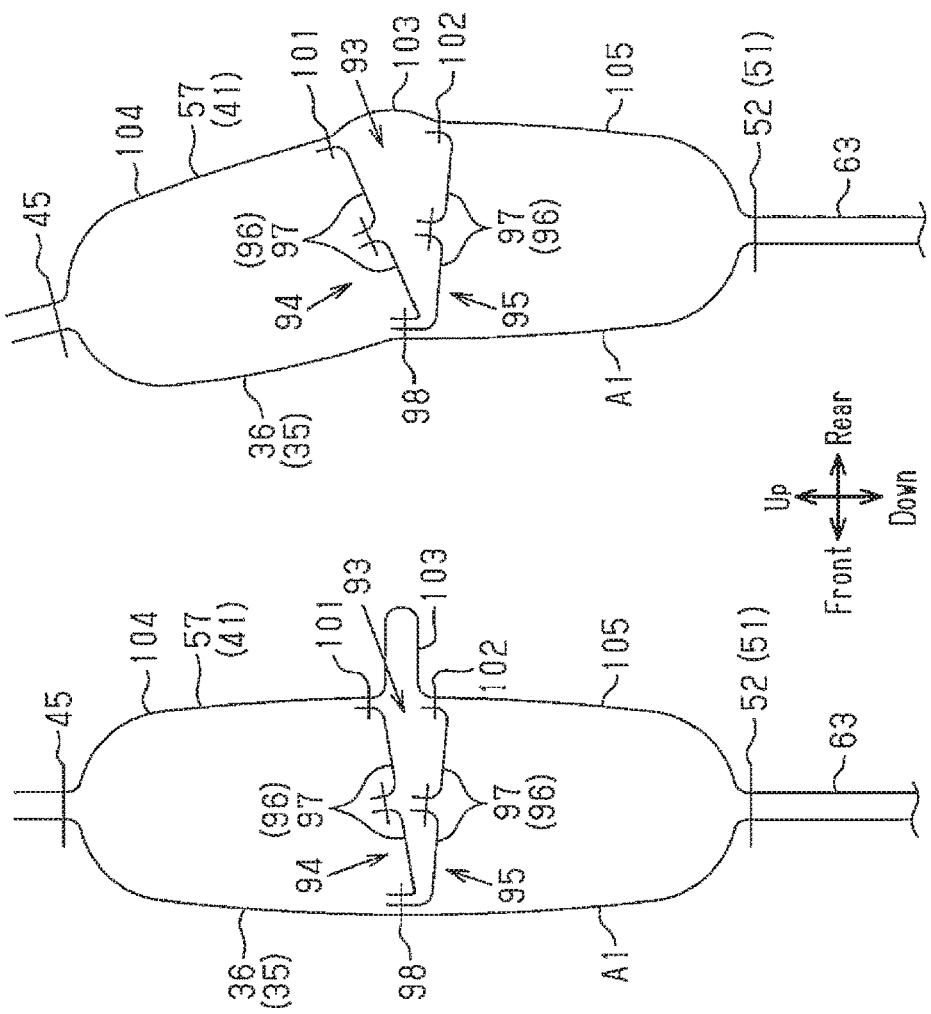

AIRBAG APPARATUS

BACKGROUND

The present disclosure relates to an airbag apparatus that protects an occupant seated in a rear seat of a conveyance from an impact by inflating an airbag in front of the occupant when the impact is applied to the conveyance from the front of the rear seat.

A rear-seat airbag apparatus is effective for protecting an occupant seated in a rear seat from an impact when the impact is applied to a vehicle from the front due to, for example, a collision. The inflator and airbag of this airbag apparatus are both arranged in the seat back of a front seat.

German Patent Application Publication No. 10201836 discloses such a rear-seat airbag apparatus. The airbag of this airbag apparatus has an upper inflation portion and a lower inflation portion.

In the above-described airbag apparatus, when the application of an impact to the vehicle from the front is detected or when the application of an impact is predicted, the inflator supplies inflation gas to each of the upper inflation portion and the lower inflation portion.

The upper inflation portion is inflated by the inflation gas supplied from the inflator, thereby breaking the upper part of the covering, which constitutes the outer shell of the seat back. The upper inflation portion continues being inflated outside the seat back even after breaking the covering.

The lower inflation portion is inflated by the inflation gas, thereby breaking the lower part of the covering. The lower inflation portion continues being inflated outside the seat back even after breaking the covering.

An impact applied to the vehicle from the front stops the vehicle, but the occupant, who is restrained by the seatbelt device, receives a forward-moving force due to inertia. However, when the knees of the occupant are received by the lower inflation portion in the inflated state, the knees are protected from the impact and the forward movement of the occupant is restricted.

Furthermore, the upper body of the occupant, who is restricted from moving forward, receives a forward-inclining force with the knees serving as the pivot due to inertia. However, when the head of the occupant is received by the upper inflation portion in the inflated state, the head is protected from the impact and the further forward inclination of the upper body of the occupant is restricted.

In the airbag apparatus disclosed in German Patent Application Publication No. 10201836, the upper inflation portion and the lower inflation portion of the airbag are both inflated between the seat back of the front seat and the occupant in the rear seat. This requires large volumes for the upper and lower inflation portions and thus inevitably results in a larger volume of the airbag. Accordingly, a large inflator that discharges a large amount of inflation gas will be necessary.

SUMMARY

Accordingly, it is an objective of the present disclosure to provide an airbag apparatus capable of reducing the volume of an airbag for protecting an occupant in a rear seat.

To achieve the foregoing objective and in accordance with one aspect of the present disclosure, an airbag apparatus is provided that includes an inflator, which discharges inflation gas, and an airbag, which is arranged inside a seat back of a front seat that is forward of a rear seat in a conveyance. The inflation gas is supplied to the airbag from the inflator. The airbag includes a lower inflation portion and an upper inflation portion. The lower inflation portion is inflated by the inflation gas only inside a lower part of the seat back of the front seat. The upper inflation portion is arranged inside the seat back and above the lower inflation portion. The upper inflation portion is inflated above the lower inflation portion by the inflation gas, breaks a covering, which constitutes an outer shell of the seat back, and is inflated outside the seat back through the broken part of the covering.

BRIEF DESCRIPTION OF THE DRAWINGS

FIG. 6 is a rear view of the airbag module in the first embodiment.

FIG. 7 is a diagram showing a state before the front fabric portion and the rear fabric portion of the airbag module of the first embodiment are joined to each other.

FIG. 10 is a partial side view showing the relationship between the front seat and the inflated airbag in a second embodiment.

FIG. 11 is a partial rear view showing the relationship between the front seat and the inflated airbag in the second embodiment.

FIG. 12 is a cross-sectional side view of the airbag module with the airbag inflated in the second embodiment.

FIG. 19 is a partial cross-sectional side view showing a modification in which part of the upper inflation portion is folded inward.

FIG. 20A is a partial cross-sectional side view of an upper inflation portion of a modification, illustrating a state before the upper inflation portion is bent by the bend assisting portion.

FIG. 20B is a partial cross-sectional side view of the upper inflation portion of the modification of FIG. 20A, illustrating a state after the upper inflation portion is bent by the bend assisting portion.

DETAILED DESCRIPTION OF THE PREFERRED EMBODIMENTS

First Embodiment

A vehicle airbag apparatus according to a first embodiment will now be described with reference to FIGS. 1 to 9.

In the following description, the direction in which the vehicle advances forward will be referred to as the front, and the reverse direction will be referred to as the rear. The up-down direction refers to the up-down direction of the vehicle, and the left-right direction refers to the width direction of the vehicle (vehicle width direction) that matches with the left-right direction when the vehicle is advancing forward.

Figure 1:
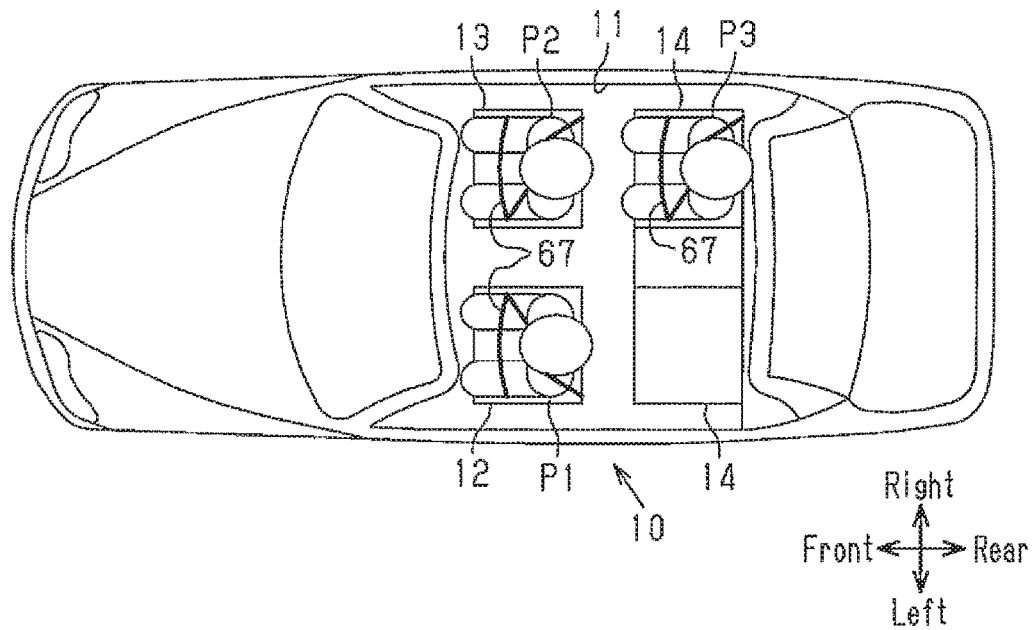
FIG. 1 is a plan view showing the relationship between the front seats, the rear seats, and the occupants in a vehicle according to a first embodiment.

As shown in FIG. 1, a pair of front seats 12, 13 are arranged side by side in the vehicle width direction in the front of the passenger compartment 11 of a vehicle 10. An occupant P1 is seated in the left front seat 12. An occupant P2 is seated in the right front seat 13. One of the front seats 12, 13 functions as the driver's seat, and the other of the front seats 12, 13 functions as the front passenger seat. In the passenger compartment 11 and behind the front seats 12, 13, rear seats 14 are arranged side by side in the vehicle width direction. In the present embodiment, an occupant P3 is seated in the rear seat 14 located behind the front seat 13.

Figure 2:
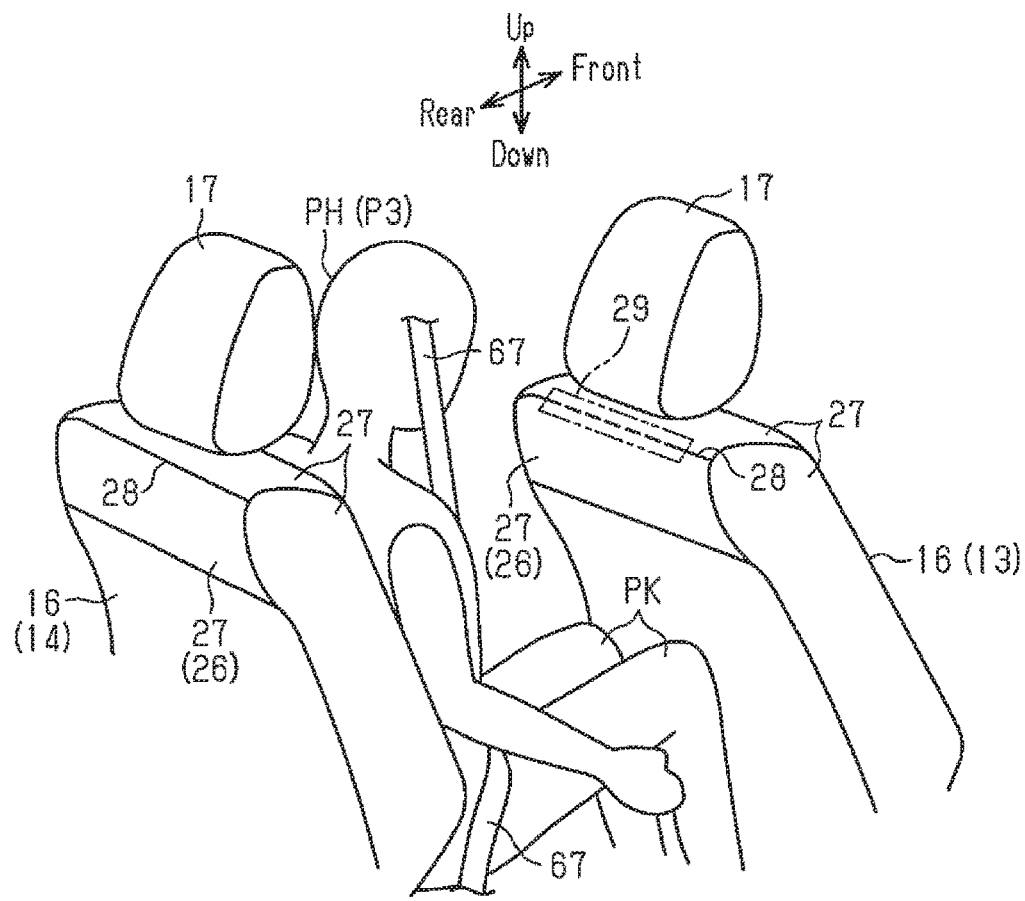
FIG. 2 is a partial perspective view showing the relationship between the front seat and the occupant in the rear seat protected from an impact by the airbag in the first embodiment.
Figure 3:
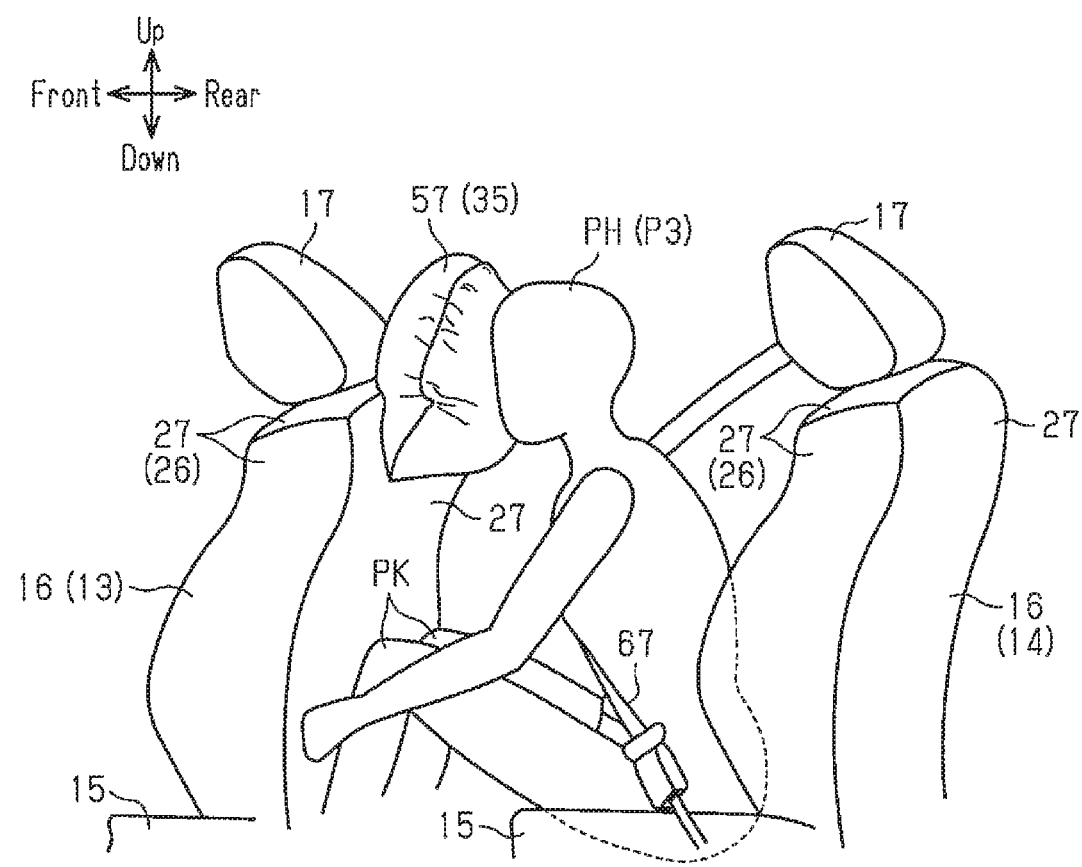
FIG. 3 is a partial perspective view showing how the occupant in the rear seat is protected from an impact by the airbag in the first embodiment.

In FIGS. 2 and 3, the occupant P2 in the front seat 13 is not shown. Also, in FIGS. 1 to 3, which illustrate the present embodiment, the occupant P3 to be protected is depicted as seated in the rear seat 14 behind the front seat 13. However, the occupant P3 may be seated in the rear seat 14 different from the one behind the front seat 13. For example, the occupant P3 may be seated in the rear seat 14 located behind the front seat 12. In this case, the occupant P3 may be protected by the airbag apparatus located in the seat back of the front seat 12.

As shown in FIGS. 1 to 3, each of the front seats 12, 13 and the rear seats 14 includes a seat cushion 15, a seat back 16, which extends upward from the seat cushion 15, and a headrest 17 arranged at the top of the seat back 16. The front seats 12, 13 and the rear seats 14 are arranged in the passenger compartment 11 such that the seat back 16 is positioned behind the seat cushion 15. The width direction of the front seats 12, 13 and the rear seats 14 arranged in this manner coincides with the vehicle width direction.

Figure 5:
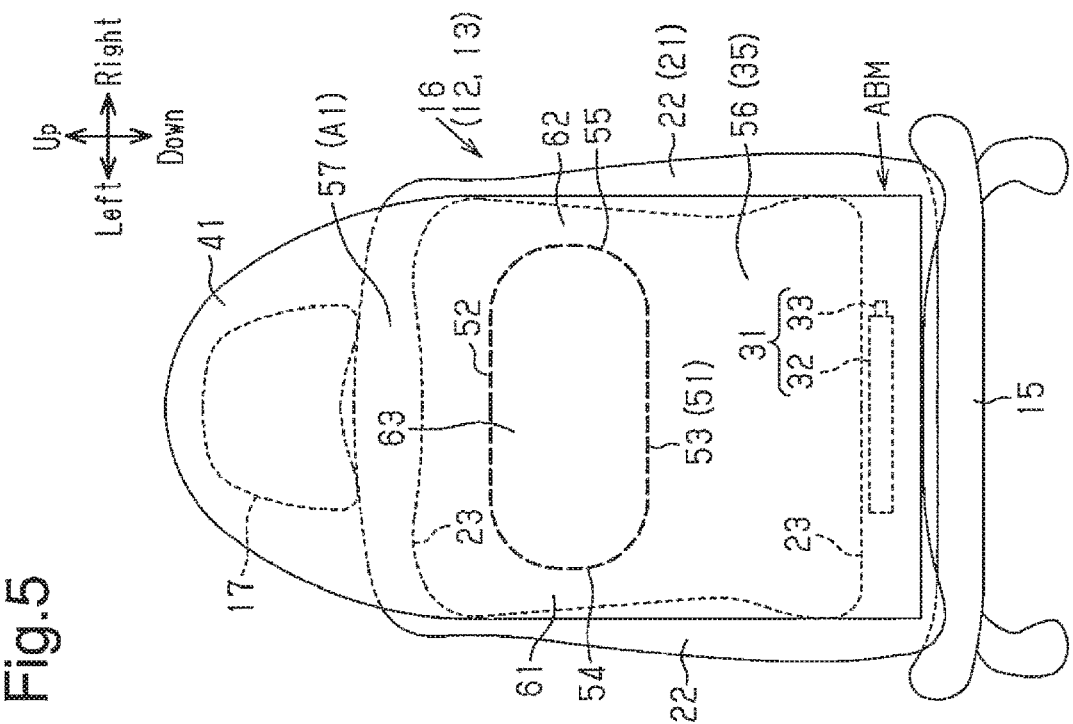
FIG. 5 is a rear view showing the relationship between the front seat and the inflated airbag in the first embodiment.
Figure 4:
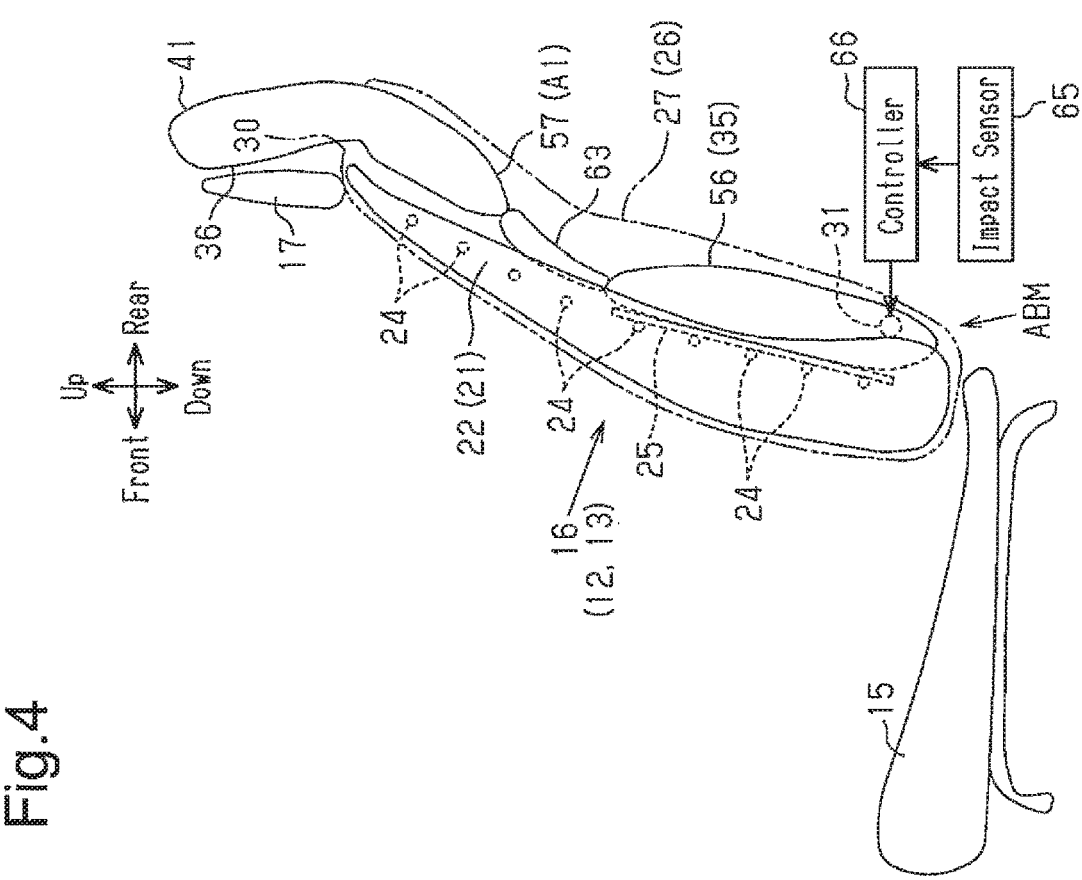
FIG. 4 is a side view showing the relationship between the front seat and the inflated airbag in the first embodiment.

As shown in FIGS. 4 and 5, the framework of the seat back 16 is constituted by a seat frame 21. The seat frame 21 includes a pair of vertical frame portions 22, which are separated from each other in the vehicle width direction and extend substantially in the up-down direction, and a pair of lateral frame portions 23, which are separated from each other in the up-down direction and extend in the vehicle width direction.

Figure 8:
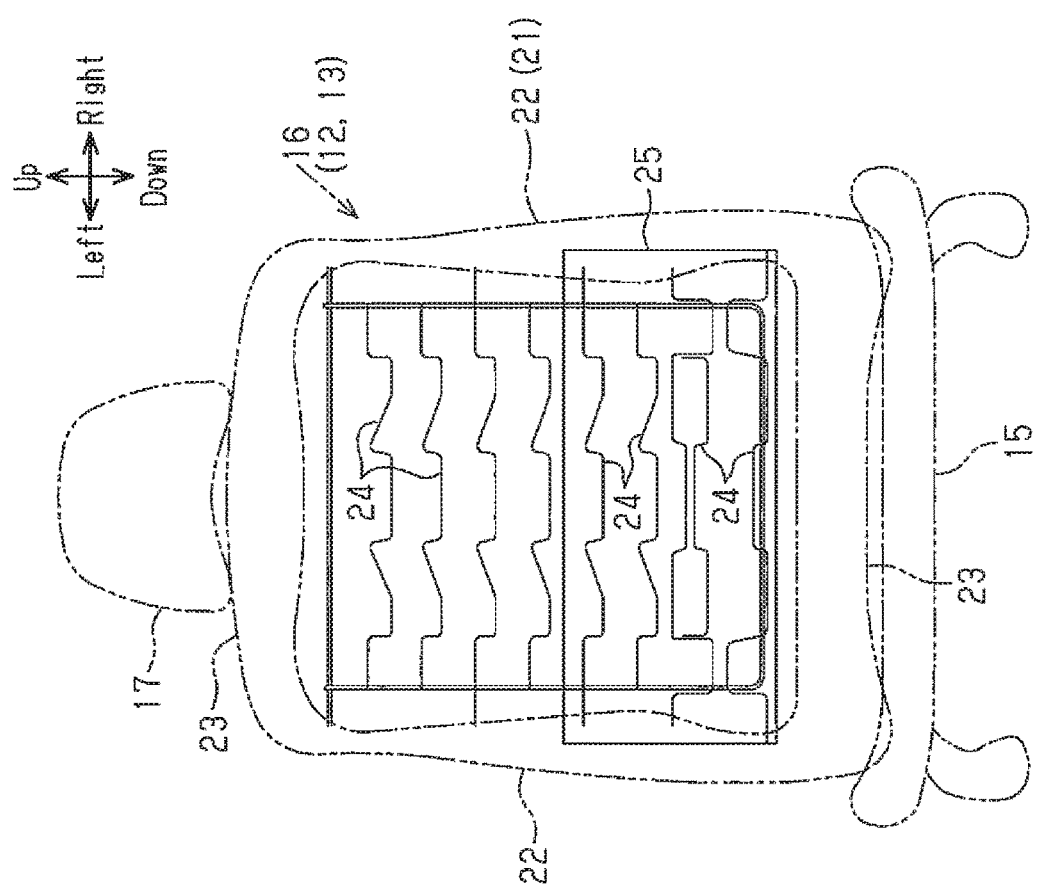
FIG. 8 is a rear view showing the relationship between the wire frame portions and the pressure receiving plate in the first embodiment.

As shown in FIG. 8, the seat frame 21 further includes wire frame portions 24. The wire frame portions 24 are arranged to be separated from each other in the up-down direction and bridge the vertical frame portions 22. The wire frame portions 24 function as springs for improving the riding comfort.

The seat back 16 incorporates a seat pad (not shown) made of an elastic material such as urethane foam in front of the wire frame portions 24.

As shown in FIGS. 4 and 8, a pressure receiving plate 25 is arranged behind and adjacent to ones of the wire frame portions 24 that are located at the lower part of the seat back 16. The pressure receiving plate 25 is made of, for example, plastic or metal and has a higher stiffness than that of the wire frame portions 24. The pressure receiving plate 25 bridges the vertical frame portions 22.

As shown in FIGS. 2 to 4, the seat frame 21 and the seat pad are covered by a covering 26, which constitutes the outer shell of the seat back 16. The covering 26 is formed by a plurality of covering pieces 27. The adjacent covering pieces 27 are joined together by peripheral joint portion 28 provided along the peripheral edges. Part of the peripheral joint portion 28 extends in the vehicle width direction at the upper end of the seat back 16 and behind the headrest 17.

The illustration of the covering pieces 27 is omitted in FIG. 5. The same applies to FIGS. 8, 11, 16, 18A, and 18B, which will be discussed below.

In the front seats 12, 13, at least part of the upper end of the peripheral joint portion 28 is formed by using sewing threads having a lower strength than those used in the remaining parts of the peripheral joint portion 28. For example, thinner threads are used to form this part of the peripheral joint portion 28. This part of the peripheral joint portion 28 constitutes a breakable portion 29, which is broken when an upper inflation portion 57 of an airbag 35, which will be discussed below, is deployed and inflated. In FIG. 2, the part of the peripheral joint portion 28 that is surrounded by the long dashed double-short dashed line is the breakable portion 29.

The peripheral joint portion 28 may be formed by a method other than sewing using sewing threads as described above, and may be formed by, for example, using adhesive. In this case, the peripheral joint portion 28 is formed by adhering the peripheral edges of the adjacent covering pieces 27 together using adhesive. In the breakable portion 29, the peripheral edges of the adjacent covering pieces 27 are adhered to each other with a smaller amount of adhesive than those in the remaining parts of the peripheral joint portion 28.

As shown in FIGS. 4 and 5, the seat back 16 of each of the front seats 12, 13 incorporates an airbag module ABM, which is the main component of the airbag apparatus. The airbag module ABM includes an inflator 31 and an airbag 35.

The inflator 31 includes a substantially columnar main body 32, which accommodates a gas generating agent, a gas outlet 33, which is arranged at one end of the main body 32 and discharges inflation gas generated in the main body 32. A harness (not shown) for sending control signals to the inflator 31 is connected to the other end of the main body 32.

As the inflator 31, a hybrid type inflator that uses both a gas generating agent and a high-pressure gas may be used. In a hybrid-type inflator, an igniter is first ignited and the gas generating agent is ignited by the heat generated by the igniter. The high-pressure gas is heated by the heat of the gas generated by the combustion of the gas generating agent, which raises the gas pressure. The pressurized high-pressure gas is then discharged from the gas outlet as inflation gas.

Figure 9:
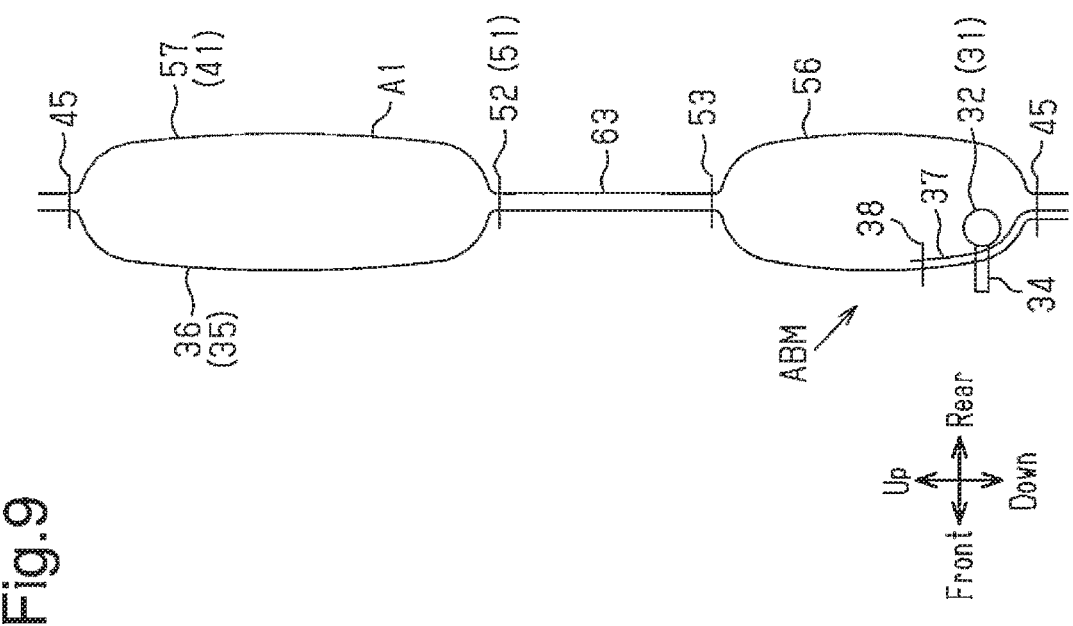
FIG. 9 is a cross-sectional side view of the airbag module with the airbag inflated in the first embodiment.

As shown in FIG. 9, a bolt 34 for fixing the inflator 31 to the seat frame 21 is fixed to the main body 32.

As shown in FIGS. 6, 7, and 9, the airbag 35 includes a front fabric portion 36 and a rear fabric portion 41, which is formed separately from the front fabric portion 36 and arranged behind the front fabric portion 36. The front fabric portion 36 and the rear fabric portion 41 have the same shape. The front and rear fabric portions 36, 41 are made of a material having high strength and flexibility to be easily folded. The material may be, for example, woven cloth formed of polyester threads or polyamide threads.

A reinforcing fabric sheet 37 made of the same material as the front fabric portion 36 is stacked on the lower part of the rear surface of the front fabric portion 36. This part is where the inflator 31 is arranged and secured. The reinforcing fabric sheet 37 is joined to the lower part of the front fabric portion 36 at the peripheral edge. The upper edge and the side edges in the vehicle width direction of the reinforcing fabric sheet 37 are joined to the front fabric portion 36 by a peripheral joint portion 38. The peripheral joint portion 38 is formed by sewing the reinforcing fabric sheet 37 to the front fabric portion 36. In FIG. 7, the peripheral joint portion 38 is indicated by a broken line that is thicker than a typical broken line (hidden line). Also, the lower edge of the reinforcing fabric sheet 37 is joined to the front fabric portion 36 by a peripheral joint portion 45 (see FIG. 6), which will be discussed below. In FIG. 6, the peripheral joint portion 45 is indicated by a broken line that is thicker than a typical broken line (hidden line). This also applies to inner joint portions 51, 84, a joint portion 76, and a peripheral joint portion 83.

The reinforcing fabric sheet 37 is used to make the heat of the inflation gas discharged from the gas outlet 33 of the inflator 31 less likely to be transferred to the front fabric portion 36, thereby reducing the influence of the heat on the front fabric portion 36.

The peripheral joint portion 45 is provided along the peripheral edges of the front fabric portion 36 and the rear fabric portion 41 so as to join the front fabric portion 36 and the rear fabric portion 41 into a bag shape. The peripheral joint portion 45 is formed by sewing the front fabric portion 36 and the rear fabric portion 41 together.

The peripheral joint portions 38, 45 may be formed by a method other than sewing using sewing threads as described above, and may be formed by, for example, using adhesive. This configuration applies to various types of joint portions, which will be discussed below. The various types of joint portions are the inner joint portions 51, 84, joint portions 75, 76, 98, 101, 102, and peripheral joint portion 83.

As shown in FIGS. 6, 7, and 9, in the front fabric portion 36 and the rear fabric portion 41, the inner joint portion 51 is provided in a region A1 surrounded by the peripheral joint portion 45. The inner joint portion 51 is an intermediate portion in the up-down direction of the region A1 and is provided in an intermediate portion in the vehicle width direction. The inner joint portion 51 joins the front fabric portion 36 and the rear fabric portion 41 so that these fabric portions 36, 41 contact each other. The inner joint portion 51 is constituted by a pair of lateral joint portions 52, 53 and a pair of vertical joint portions 54, 55. The lateral joint portions 52, 53 are provided at two positions separated from each other in the up-down direction. Each of the lateral joint portions 52, 53 has a linear shape extending in the vehicle width direction. The vertical joint portions 54, 55 are provided at two positions separated from each other in the vehicle width direction. The left vertical joint portion 54 joins the left ends of the lateral joint portions 52, 53 together.

The right vertical joint portion 55 joins the right ends of the lateral joint portions 52, 53 together.

The part of the region A1 below the lower lateral joint portion 53 constitutes a lower inflation portion 56. The lower inflation portion 56 incorporates the inflator 31. The lower inflation portion 56 is arranged, without being folded, inside the lower part of the seat back 16 and is arranged behind and adjacent to the pressure receiving plate 25 (see FIG. 4). The inflator 31 is arranged in the lower inflation portion 56 such that the main body 32 extends in the vehicle width direction. The main body 32 and the gas outlet 33 of the inflator 31 are both positioned in the lower inflation portion 56.

The inflator 31 is positioned with respect to the airbag 35 by inserting the bolt 34, which protrudes from the main body 32 (see FIG. 9), through the reinforcing fabric sheet 37 and the front fabric portion 36. The bolt 34 is inserted through the seat frame 21. The inflator 31 is attached to the seat frame 21 together with the reinforcing fabric sheet 37 and the front fabric portion 36 by fastening a nut (not shown) to the bolt 34.

The inflator 31 may be attached to the seat frame 21 using members other than the bolt 34 and nut. Alternatively, the seat back 16 may incorporate a member (not shown) that has approximately the same strength as the seat frame 21, and the inflator 31 may be attached to this member.

As shown in FIGS. 6 and 9, the part of the region A1 above the upper lateral joint portion 52 constitutes the upper inflation portion 57. The upper inflation portion 57 is arranged in a folded state above the lower inflation portion 56 in the seat back 16. As the part satisfying the above conditions, the upper inflation portion 57 is arranged inside the upper part of the seat back 16.

For example, the roll-folding and the accordion-folding are suitable as methods for folding the upper inflation portion 57. The roll-folding refers to a folding method in which the upper end of the upper inflation portion 57 is defined as the center and the remaining portion is wrapped about the center. The accordion-folding refers to a folding method in which the upper inflation portion 57 is repeatedly folded downward while alternating the folding direction by a constant width.

As shown in FIGS. 5 and 6, parts of the region A1 that are outward of the lateral joint portions 52, 53 in the vehicle width direction, in other words, the parts outward of the vertical joint portions 54, 55, respectively constitute coupling portions 61, 62. The coupling portions 61, 62 extend in the up-down direction and couple the lower inflation portion 56 and the upper inflation portion 57 to each other so that the inflation portions 56, 57 communicate with each other.

The lateral joint portions 52, 53 of the inner joint portion 51 constitute the lower inflation portion 56, the upper inflation portion 57, and the coupling portions 61, 62 in the region A1. Besides the above, the lateral joint portions 52, 53 also function to limit the dimensions in the front-rear direction of the lower inflation portion 56, the upper inflation portion 57, and the coupling portions 61, 62 when inflated by inflation gas. In the parts where the lateral joint portions 52, 53 are provided, the front fabric portion 36 and the rear fabric portion 41 are joined so as to be in contact with each other, and the distance between the front fabric portion 36 and the rear fabric portion 41 is minimized.

The dimension in the front-rear direction of each of the coupling portions 61, 62 in the inflated state is set to be smaller than the dimension in the front-rear direction of the upper inflation portion 57 in the inflated state and smaller than the dimension in the front-rear direction of the lower inflation portion 56 in the inflated state. Such dimensions are determined by the lengths in the vehicle width direction of the lateral joint portions 52, 53, the distance between the lateral joint portions 52, 53, and the distance between the ends of the lateral joint portions 52, 53 and the peripheral joint portion 45.

In the front fabric portion 36 and the rear fabric portion 41, the region surrounded by the inner joint portion 51 is a non-inflation portion 63, to which inflation gas is not supplied.

As shown in FIG. 7, the front fabric portion 36 has attachment protrusions 39 on the opposite sides in the vehicle width direction. Also, the rear fabric portion 41 has attachment protrusions 42 on the opposite sides in the vehicle width direction. The front fabric portion 36 and the rear fabric portion 41 are stacked on each other such that the left attachment protrusion 39 of the front fabric portion 36 in FIG. 7 and the right attachment protrusion 42 of the rear fabric portion 41 in FIG. 7 are put together and that the right attachment protrusion 39 and the left attachment protrusion 42 are put together, thereby holding the inflator 31 between the front fabric portion 36 and the rear fabric portion 41. The airbag 35 is attached to the seat frame 21 at these attachment protrusions 39, 42. In this manner, the airbag 35 is attached to the seat frame 21 at three positions, that is, the attachment protrusions 39, 42 on the opposite sides in the vehicle width direction and the intermediate portion (the part where the inflator 31 is secured).

As shown in FIG. 4, the airbag apparatus includes an impact sensor 65 and a controller 66 in addition to the above described airbag module ABM. The impact sensor 65 includes an acceleration sensor and detects an impact applied to the vehicle 10 from the front. The controller 66 controls operation of the inflator 31 based on a detection signal from the impact sensor 65.

Furthermore, as shown in FIGS. 1 to 3, the vehicle 10 is equipped with seatbelt devices 67 for restraining the occupants P1, P2, P3 to the front seats 12, 13 and the rear seats 14.

Operations and advantages of the first embodiment, which is configured as described above, will now be described. The case will be discussed below in which the occupant P3 in the rear seat 14 is protected from an impact.

When the impact sensor 65 does not detect any impact applied to the vehicle 10 from the front, the controller 66 does not output to the inflator 31 an activation signal for activating the inflator 31. The inflator 31 thus does not discharge inflation gas. The upper inflation portion 57 of the airbag 35 remains in the seat back 16 like the lower inflation portion 56, the coupling portions 61, 62, and the non-inflation portion 63.

In contrast, when an impact is applied to the vehicle 10 from the front due to, for example, a frontal collision while the vehicle 10 is running, the vehicle 10 is stopped but the occupant P3, who is restrained by the seatbelt device 67, receives a forward-moving force due to inertia.

When an impact greater than or equal to a predetermined value is applied to the vehicle 10 from the front and this is detected by the impact sensor 65, the controller 66 outputs an activation signal to the inflator 31 based on the detection signal. In response to the activation signal, the inflator 31 discharges inflation gas through the gas outlet 33.

As shown in FIG. 5, in the first embodiment, the lower inflation portion 56 and the upper inflation portion 57 are coupled to each other by the coupling portions 61, 62 to communicate with each other. Furthermore, the lower inflation portion 56, the upper inflation portion 57, and the coupling portions 61, 62 are supplied with inflation gas from the common inflator 31.

Thus, as shown in FIGS. 4 and 5, the inflation gas is first supplied to the lower inflation portion 56, in which the main body 32 and the gas outlet 33 of the inflator 31 are arranged. The inflation gas inflates the lower inflation portion 56 in the lower part of the seat back 16, which is in front of the knees PK of the occupant P3. The inflation of the lower inflation portion 56 pushes the lower part of the covering 26 rearward so that the part is deformed to bulge rearward.

Some the inflation gas supplied to the lower inflation portion 56 is supplied to the upper inflation portion 57 through the coupling portions 61, 62. When supplied with inflation gas, the coupling portions 61, 62 are inflated between the lower inflation portion 56 and the upper inflation portion 57 in the seat back 16.

Further, when supplied with the inflation gas, the upper inflation portion 57 is inflated (deployed) while being unfolded above the lower inflation portion 56. Being deployed and inflated, the upper inflation portion 57 applies a pressing force to the covering 26, so that the covering 26 is broken at the breakable portion 29 (see FIG. 2), which is located rearward of the headrest 17.

When the breakable portion 29 is broken, the upper inflation portion 57 is projected from the seat back 16 through an opening 30, which is created by the breakage, with a part remaining in the seat back 16. The upper inflation portion 57 continues to be deployed and inflated behind the headrest 17 and in front of the head PH of the occupant P3.

Since the inflation gas flows in the above-described order, the lower inflation portion 56, the coupling portions 61, 62, and the upper inflation portion 57 sequentially start being inflated in the order.

Accordingly, when the occupant P3 receives a forward-moving force due to inertia, the knees PK of the occupant P3 are received by the part where the lower inflation portion 56 is inflated in the lower part of the seat back 16. This protects the knees PK from the impact and restricts the forward movement of the occupant P3.

Furthermore, the upper body of the occupant P3, who is restricted from moving, receives a forward-inclining force with the knees PK serving as the pivot due to inertia. However, in front of the head PH, the upper inflation portion 57 is inflated outside the seat back 16 as described above. The upper part of the upper inflation portion 57 is thus pushed forward by the head PH. The headrest 17 is located in front of the upper part of upper inflation portion 57. The forward movement of the upper part of the upper inflation portion 57 is restricted by the headrest 17. As described above, the head PH is received by the upper inflation portion 57, which is restricted from moving, and is protected from the impact. Further, the upper body of the occupant P3 is restrained from further inclining forward.

Of the inflation portions constituting the airbag 35, the upper inflation portion 57 is inflated inside and outside the seat back 16, while the lower inflation portion 56 is inflated only inside the seat back 16. Therefore, the volume of the lower inflation portion 56 can be reduced as compared with the case where it is inflated inside and outside the seat back 16. Accordingly, the overall volume of the airbag 35 can be reduced. This allows an inflator 31 with a small discharged amount of inflation gas to be employed.

Also, the dimension in the front-rear direction of each of the coupling portions 61, 62 in the inflated state is smaller than the dimension in the front-rear direction of the upper inflation portion 57 in the inflated state and smaller than the dimension in the front-rear direction of the lower inflation portion 56 in the inflated state. This further reduces the total volume of the airbag 35 as compared with the case in which the dimensions in the front-rear direction of the coupling portions 61, 62 in the inflated state are greater than the dimension in the front-rear direction of at least one of the lower inflation portion 56 and the upper inflation portion 57 in the inflated state.

In addition to the ones listed above, the first embodiment achieves the following advantages.

It is desirable that the breakable portion 29 (see FIG. 2) remain unbroken when receiving a force equivalent to pushing by the occupant P3 in the rear seat 14. To that end, it is necessary to increase the strength of the breakable portion 29. This, on the other hand, would make the breakable portion 29 be less likely to be broken when the upper inflation portion 57 is deployed and inflated.

In this regard, the first embodiment causes the lower inflation portion 56 to start being inflated at an earlier time than the upper inflation portion 57 as described above. Before the upper inflation portion 57 starts to be inflated, the lower inflation portion 56 pushes the lower part of the covering 26 rearward, so that the covering 26 is stretched more than when the lower inflation portion 56 is not inflated. This applies a breaking force to the breakable portion 29. In this state, since the pressing force of the inflated upper inflation portion 57 is applied to the breakable portion 29, the breakable portion 29 is easily broken.

As a result, even if the breakable portion 29 is formed to have a high strength, the breakable portion 29 can be properly broken at the time of inflation of the upper inflation portion 57. Further, even when the breakable portion 29 is pushed by the occupant P3 when the airbag 35 is not inflated, the breakable portion 29 will not be broken.

The pressure receiving plate 25 is arranged at the lower part of the seat back 16 between the wire frame portions 24 and the lower inflation portion 56 (see FIG. 4). Upon inflation of the lower inflation portion 56, the pressure receiving plate 25 receives the pressure of the inflation gas acting forward in the lower inflation portion 56, and generates a rearward reaction force. Therefore, the forward inflation of the lower inflation portion 56 is restricted by the pressure receiving plate 25, so that the lower inflation portion 56 is inflated rearward by a greater amount.

The distance between the knees PK of the occupant P3 in the rear seat 14 and the seat back 16 of the front seat 12, 13 is narrower than the distance between the upper body of the occupant P3 and the seat back 16. In addition, when an impact is applied to the vehicle 10 from the front, the occupant P3 moves forward, so that the distance is further reduced. Therefore, if the lower inflation portion 56 were made to protrude rearward from the seat back 16, it would be difficult to inflate the lower inflation portion 56 in the narrow space between the seat back 16 and the knees PK of the occupant P3.

In this regard, the lower inflation portion 56 is inflated only inside the seat back 16 in the first embodiment. Therefore, even if the distance between the seat back 16 and the knees PK is small, the lower inflation portion 56 can be properly inflated to protect the knees PK from the impact in a favorable manner.

This advantage is achieved particularly effectively in a vehicle 10 in which the distance between the front seats 12, 13 and the rear seats 14 is small.

Second Embodiment

A vehicle airbag apparatus according to a second embodiment will now be described with reference to FIGS. 10 to 12.

The second embodiment includes tethers 71, 72 at two positions in the above-mentioned region A1 that are separated from each other in the up-down direction. Each of the tethers 71, 72 is constituted by a belt-shaped fabric sheet 73, which extends in the vehicle width direction between the front fabric portion 36 and the rear fabric portion 41. In the second embodiment, the fabric sheet 73 is constituted by a pair of front and rear fabric pieces 74, which are joined to each other. However, the fabric sheet 73 may be constituted by a single fabric piece or more than two fabric pieces. The fabric sheet 73 in each of the tethers 71, 72 is joined to the front fabric portion 36 by a joint portion 75 provided along its front edge. Also, the fabric sheet 73 in each of the tethers 71, 72 is joined to the rear fabric portion 41 by a joint portion 76 provided along its rear edge. Through the joining, the tethers 71, 72 bridge the front fabric portion 36 and the rear fabric portion 41.

The upper tether 71 corresponds to the upper lateral joint portion 52 in the inner joint portion 51 of the first embodiment, and the lower tether 72 corresponds to the lower lateral joint portion 53.

The part of the region A1 below the lower tether 72 constitutes a lower inflation portion 56. The part of the region A1 above the upper tether 71 constitutes an upper inflation portion 57. Portions of the region A1 that are outward of the tethers 71, 72 in the vehicle width direction respectively constitute coupling portions 61, 62. Only the coupling portion 61 is illustrated in FIG. 11.

The tethers 71, 72 also function to limit the dimensions in the front-rear direction of the lower inflation portion 56, the upper inflation portion 57, and the coupling portions 61, 62 when inflated by inflation gas. As the lower inflation portion 56, the upper inflation portion 57, and the coupling portions 61, 62 are inflated, the tethers 71, 72 are pulled in the front-rear direction. The distance between the front fabric portion 36 and the rear fabric portion 41 is smaller in the positions bridged by the taut tethers 71, 72 than in the other positions.

The dimension in the front-rear direction of each of the coupling portions 61, 62 in the inflated state is set to be smaller than the dimension in the front-rear direction of the upper inflation portion 57 in the inflated state and smaller than the dimension in the front-rear direction of the lower inflation portion 56 in the inflated state. Such dimensions are defined by the lengths in the vehicle width direction and the widths (the dimension in the front-rear direction) of the tethers 71, 72, the distance between the tethers 71, 72, and the distance between the ends of the tethers 71, 72 and the peripheral joint portion 45.

The second embodiment does not have portions that correspond to the vertical joint portions 54, 55 of the inner joint portion 51 in the first embodiment. Thus, inflation gas can flow into the region between the front fabric portion 36 and the rear fabric portion 41 and between the tethers 71 and 72 (the portion corresponding to the non-inflation portion 63 in the first embodiment).

Other than the differences described above, the second embodiment is the same as the first embodiment. Thus, like or the same reference numerals are given to those components that are like or the same as the corresponding components described above in the first embodiment and detailed explanations are omitted.

The second embodiment is different from the first embodiment in that the front fabric portion 36 and the rear fabric portion 41 are separated in the front-rear direction even in the parts where the tethers 71, 72 are provided. In the first embodiment, the front fabric portion 36 and the rear fabric portion 41 are in contact with each other in the parts where the lateral joint portions 52, 53 are provided. On the other hand, the second embodiment is similar to the first embodiment in that the inflation gas discharged from the gas outlet 33 is first supplied to the lower inflation portion 56 and is supplied to the upper inflation portion 57 through the coupling portions 61, 62. In this manner, the inflation gas is preferentially supplied to the lower inflation portion 56 over the upper inflation portion 57. The second embodiment thus achieves the same operations and advantages as the first embodiment.

Third Embodiment

A vehicle airbag apparatus according to a third embodiment will now be described with reference to FIGS. 13 to 16.

Figure 13:
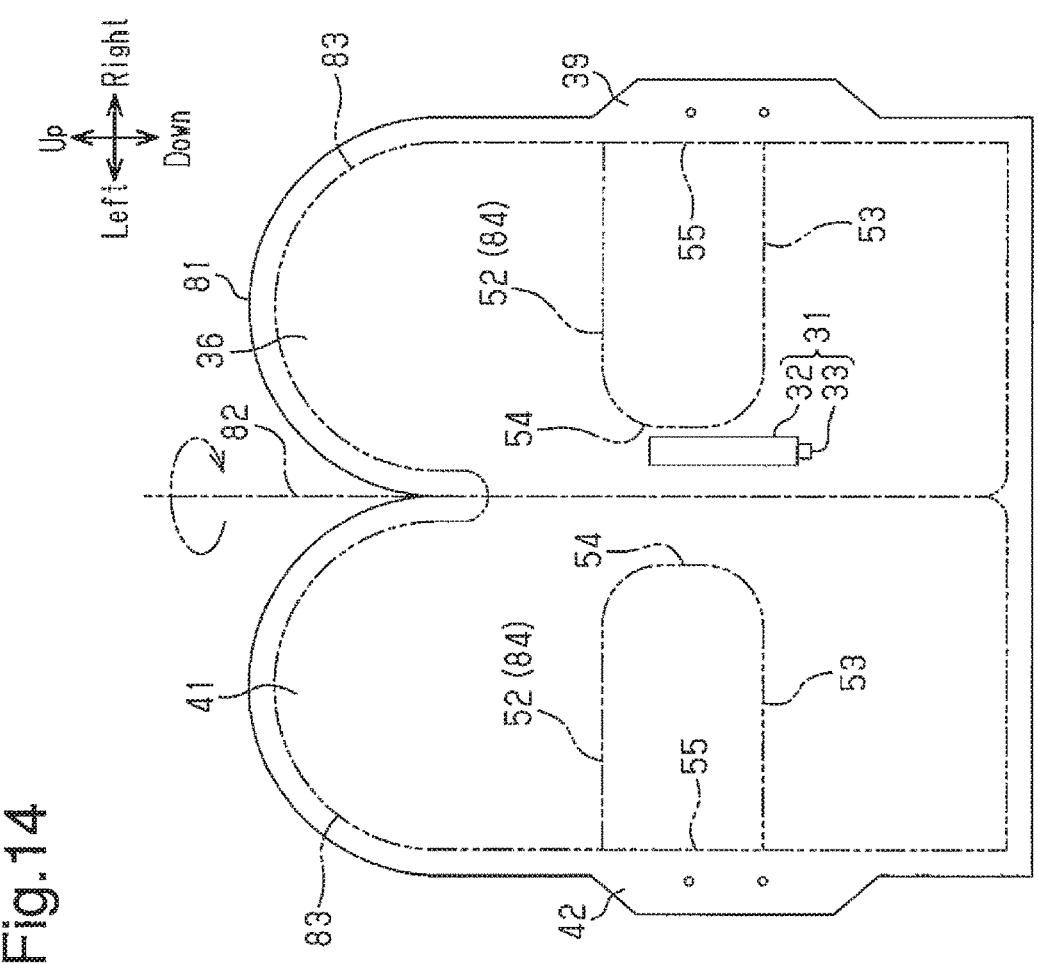
FIG. 13 is a rear view of the airbag module in a third embodiment.
Figure 14:
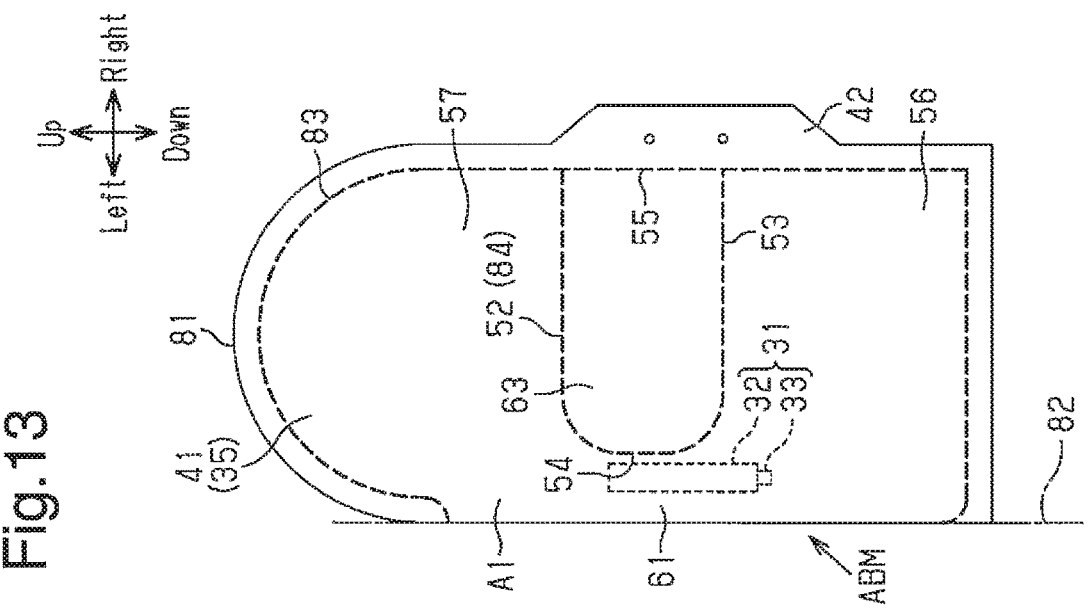
FIG. 14 is a developed view showing the positional relationship between the deployed airbag and the inflator in the third embodiment.
Figure 16:
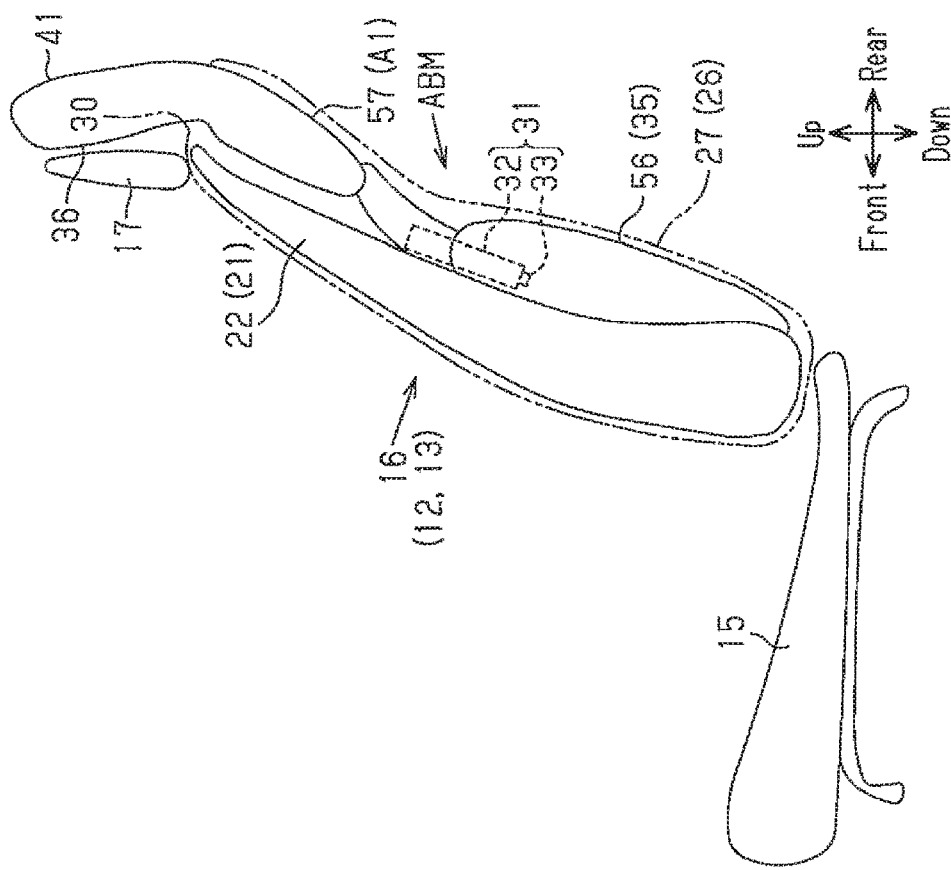
FIG. 16 is a rear view showing the relationship between the front seat and the inflated airbag in the third embodiment.

As shown in FIGS. 13, 14, and 16, the airbag 35 according to the third embodiment is formed by folding a single fabric piece 81 along a folding line 82, which is defined at the center, to be overlapped in the front-rear direction, and joining the overlapped parts to form a bag-like structure. Specifically, as indicated by an arrow about the folding line 82 in FIG. 14, the rear fabric portion 41 on the left side in FIG. 14 is stacked on the front side fabric portion 36 on the right side from the rear side so as to sandwich the inflator 31 between the front fabric portion 36 and the rear fabric portion 41. In the fabric piece 81 folded in half, the front portion corresponds to the front fabric portion 36, and the rear portion corresponds to the rear fabric portion 41.

The joining of the front fabric portion 36 and the rear fabric portion 41 is made in the peripheral joint portion 83 provided along the portion excluding the folding line 82 among the peripheral edges thereof. Thus, also in the third embodiment, the front fabric portion 36 and the rear fabric portion 41 are joined to each other at the joining portion of the peripheral edges thereof.

As in the first embodiment, in the front fabric portion 36 and the rear fabric portion 41, an inner joint portion 84 is provided in the region A1, which is surrounded by the peripheral joint portion 83 and the folding line 82. The inner joint portion 84 is an intermediate portion in the up-down direction of the region A1. The inner joint portion 84 is constituted by a pair of upper and lower lateral joint portions 52, 53 and a pair of vertical joint portions 54, 55. The left vertical joint portion 54 is provided at a position separated to the right from the folding line 82. The right ends of the lateral joint portions 52, 53 are connected to the peripheral joint portion 83, and the right vertical joint portion 55 is constituted by part of the peripheral joint portion 83.

Figure 15:
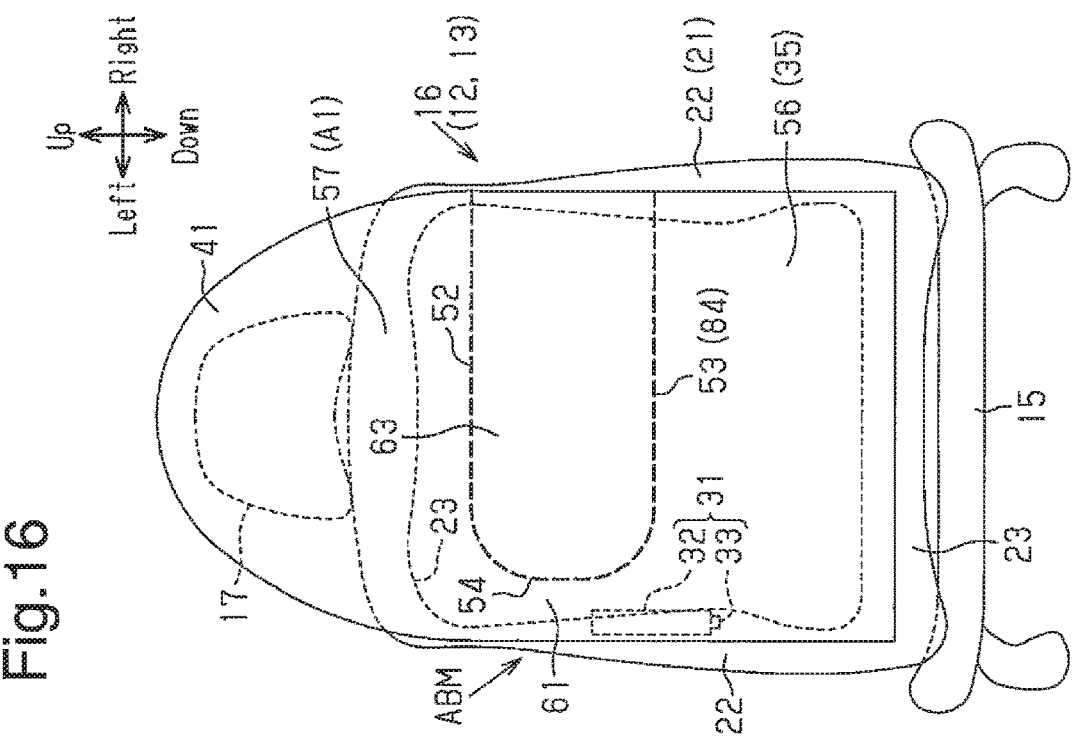
FIG. 15 is a side view showing the relationship between the front seat and the inflated airbag in the third embodiment.

As shown in FIGS. 15 and 16, the part of the region A1 below the lower lateral joint portion 53 constitutes the lower inflation portion 56. The part of the region A1 above the upper lateral joint portion 52 constitutes the upper inflation portion 57. The part of the region A1 leftward in the vehicle width direction of the lateral joint portions 52, 53 constitutes a coupling portion 61. A portion corresponding to the coupling portion 62 in the first embodiment is not provided on the right side in the vehicle width direction of the lateral joint portions 52, 53.

The common inflator 31 supplies inflation gas to the lower inflation portion 56, the upper inflation portion 57, and the coupling portion 61. The inflator 31 is arranged such that the main body 32 extends substantially in the up-down direction and the gas outlet 33 is positioned at the lower end of the main body 32. The main body 32 is arranged across the coupling portion 61 and the lower inflation portion 56. The gas outlet 33 is arranged in the lower inflation portion 56.

Since the front fabric portion 36 and the rear fabric portion 41 are connected to each other at the folding line portion 82, the attachment protrusion 39 is formed only on one side in the vehicle width direction of the front fabric portion 36 as shown in FIG. 14. Likewise, the attachment protrusion 42 is formed only on one side in the vehicle width direction of the rear fabric portion 41.

Other than the differences described above, the third embodiment is the same as the first embodiment. Thus, like or the same reference numerals are given to those components that are like or the same as the corresponding components described above in the first embodiment and detailed explanations are omitted.

The third embodiment is different from the first embodiment in that at least the upper part of the main body 32 of the inflator 31 is arranged in the coupling portion 61. On the other hand, the third embodiment is similar to the first embodiment in that the inflation gas discharged from the gas outlet 33 is first supplied to the lower inflation portion 56 and is supplied to the upper inflation portion 57 through the coupling portion 61. In this manner, the inflation gas is preferentially supplied to the lower inflation portion 56 over the upper inflation portion 57. The third embodiment thus achieves the same operations and advantages as the first embodiment.

Fourth Embodiment

A vehicle airbag apparatus according to a fourth embodiment will now be described with reference to FIGS. 17 and 18.

In the fourth embodiment, the lower inflation portion 56 and the upper inflation portion 57 of the airbag 35 are formed independently of each other. The lower inflation portion 56 is arranged inside the lower part of the seat back 16. The upper inflation portion 57 is arranged inside the upper part of the seat back 16 and is separated upward from the lower inflation portion 56.

The common inflator 31 supplies inflation gas to the lower inflation portion 56 and the upper inflation portion 57. The inflator 31 is arranged such that the main body 32 extends substantially in the up-down direction and the gas outlet 33 is positioned at the lower end of the main body 32. The inflator 31 is arranged outward in the vehicle width direction of the lower inflation portion 56 and the upper inflation portion 57. The gas outlet 33 is arranged between the lower inflation portion 56 and the upper inflation portion 57 in the up-down direction.

Between the gas outlet 33 and the upper inflation portion 57, an upper guide portion 86 for guiding some of the inflation gas discharged from the gas outlet 33 to the upper inflation portion 57 is provided. The upper guide portion 86 is formed into a tubular shape that extends substantially in the up-down direction by the same material as that of the front fabric portion 36 and the rear fabric portion 41. The upper end 86a and the lower end 86b of the upper guide portion 86 are both open. The upper end 86a of the upper guide portion 86 is joined to and communicates with the upper inflation portion 57.

Between the gas outlet 33 and the lower inflation portion 56, a lower guide portion 87 for guiding some of the inflation gas discharged from the gas outlet 33 to the lower inflation portion 56 is provided. The lower guide portion 87 is formed into a tubular shape that extends substantially in the up-down direction with the same material as that of the front fabric portion 36 and the rear fabric portion 41 and is larger than the upper guide portion 86. The upper end 87a and the lower end 87b of the lower guide portion 87 are both open. The lower end 87b of the lower guide portion 87 is joined to and communicates with the lower inflation portion 56.

The lower end 86b of the upper guide portion 86 and the upper end 87a of the lower guide portion 87 are joined to each other so as to communicate with each other at the joining portion 88. The gas outlet 33 of the inflator 31 is arranged inside the joining portion 88.

Other than the differences described above, the fourth embodiment is the same as the first embodiment. Thus, like or the same reference numerals are given to those components that are like or the same as the corresponding components described above in the first embodiment and detailed explanations are omitted.

Figures 17, 18A, 18B:
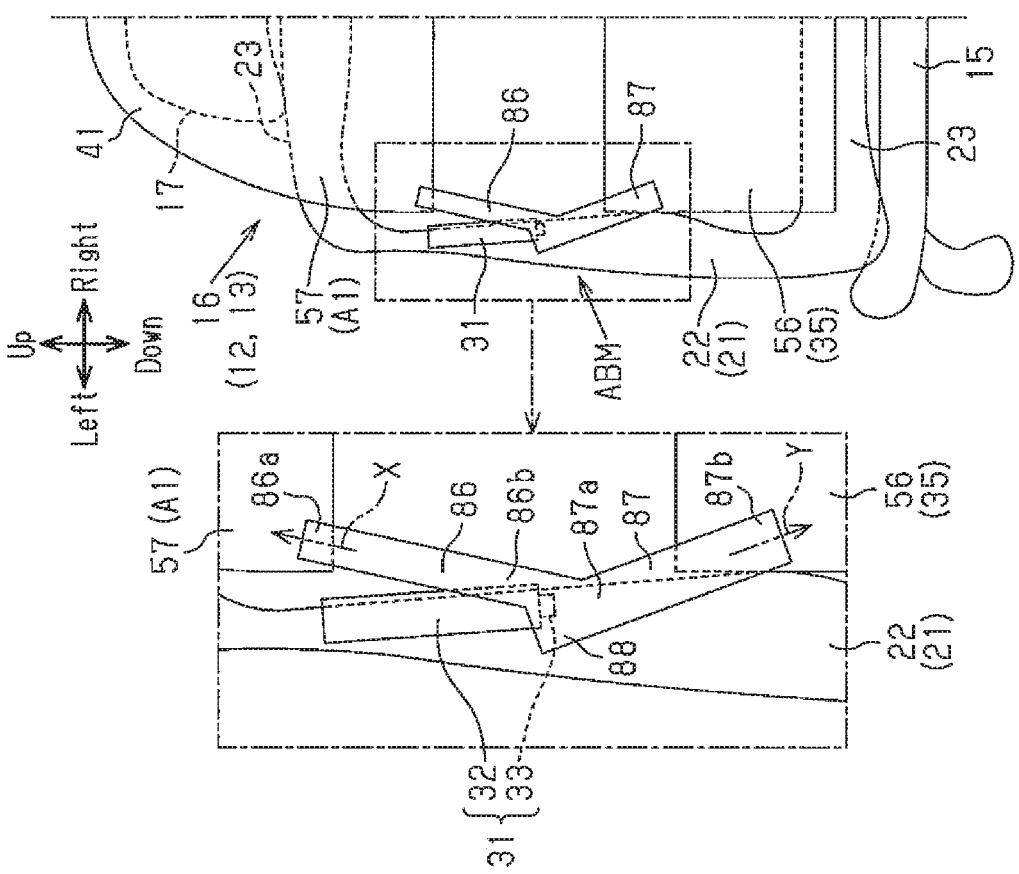
FIG. 17 is a side view showing the relationship between the front seat and the inflated airbag in a fourth embodiment.
FIG. 18A is a partial rear view showing the relationship between the front seat and the inflated airbag in the fourth embodiment.
FIG. 18B is an enlarged partial rear view illustrating a part of FIG. 18A.

In the fourth embodiment, some of the inflation gas discharged from the gas outlet 33 of the inflator 31 is guided to the upper inflation portion 57 by the upper guide portion 86 as indicated by arrow X of the long dashed double-short dashed line in FIG. 18B. Also, some of the inflation gas discharged from the gas outlet 33 is guided to the lower inflation portion 56 by the lower guide portion 87 as indicated by arrow Y of the long dashed double-short dashed line in FIG. 18B. Since the lower guide portion 87 is larger than the upper guide portion 86, the amount of the inflation gas guided from the lower guide portion 87 to the lower inflation portion 56 is greater than the amount of the inflation gas guided from the upper guide portion 86 to the upper inflation portion 57.

Therefore, in the airbag 35 to which the inflation gas is supplied as described above, the lower inflation portion 56 is inflated at an earlier time than the upper inflation portion 57. The fourth embodiment thus achieves the same operations and advantages as the first embodiment.

The above embodiments may be modified as follows.

<Regarding Covering 26>

As described in the first embodiment, the covering 26 is pushed by the lower inflation portion 56 before the upper inflation portion 57 starts being inflated, so that the covering 26 is stretched more than when the lower inflation portion 56 is not inflated. This allows the breakable portion 29 to be easily broken. In order to enhance this advantage, it is preferable to use, as the material for the covering pieces 27 of the covering 26, a material that resists stretching as compared with the material normally used for vehicle seats. For example, if covering pieces 27 having the same degree of tensile elongation as those normally used for vehicle seats are arranged on the sides of the seat back 16, covering pieces 27 made of a material having a smaller tensile elongation than the covering pieces 27 arranged on the sides of the seat back 16 may be used on the rear face of the seat back 16.

The breakable portion 29 may be provided at a position different from the peripheral joint portion 28.

The breakable portion 29 may be provided at a position below the upper end of the covering 26.

<Regarding Inflator 31>

In the first and second embodiments, in which the main body 32 is arranged to extend in the vehicle width direction, at least the gas outlet 33 of the inflator 31 needs to be arranged in the lower inflation portion 56. Thus, as with the first and second embodiments, the main body 32 and the gas outlet 33 may be entirely arranged in the lower inflation portion 56, but the parts other than the gas outlet 33 may be arranged to be exposed to the outside of the lower inflation portion 56, that is, to the outside of the airbag 35. For example, the gas outlet 33 and only part of the main body 32 may be arranged in the lower inflation portion 56, and the remaining part of the main body 32 may be arranged outside the lower inflation portion 56.

In the first and second embodiments, the inflator 31 may be arranged in the lower inflation portion 56 such that the main body 32 extends in the up-down direction.

In the first and second embodiments, the inflator 31 may be arranged in the lower inflation portion 56 such that the main body 32 is inclined.

In each of the above-described embodiments, the supply of inflation gas to the upper inflation portion 57 and the supply of inflation gas to the lower inflation portion 56 may be performed by separate inflators.

The position of the inflator 31 in the third embodiment may be changed to a position above the position shown in FIG. 13 and the gas outlet 33 may be arranged in the coupling portion 61. In this case, the coupling portion 61 may accommodate an inner tube (not shown) that extends in the up-down direction and has open upper and lower ends, and at least the gas outlet 33 of the inflator 31 may be arranged in the inner tube. The portion of the inner tube that is below the gas outlet 33 is preferably formed to be larger than the portion above the gas outlet 33. This structure guides a greater amount of the inflation gas discharged from the gas outlet 33 to the lower inflation portion 56 than to the upper inflation portion 57.

Figure 21:
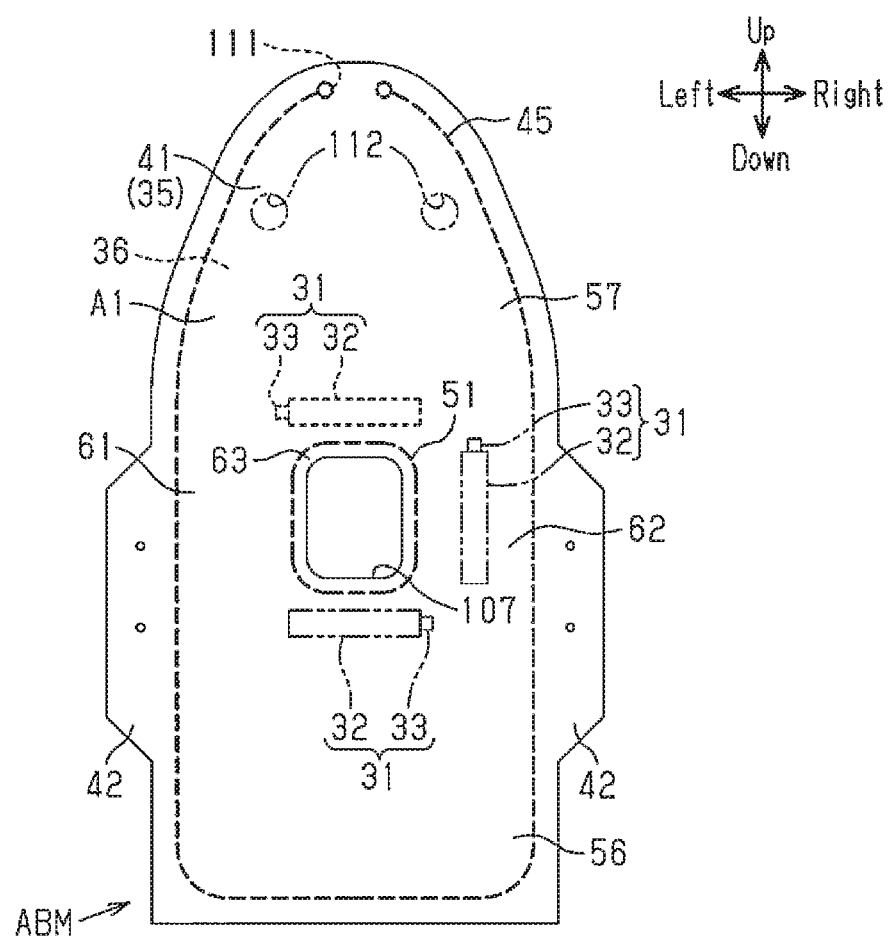
FIG. 21 is a rear view of an airbag module with the inflator arranged in different positions from the first to fourth embodiments.

The inflator 31 is arranged in the lower part of the lower inflation portion 56 in the first and second embodiments, and the inflator 31 is arranged in the left coupling portions 61 in the third embodiment. However, the inflator 31 may be arranged in a different position. FIG. 21 illustrates one such example. The inflator 31 may be arranged, for example, in the lower part of the upper inflation portion 57 (near the upper part of the inner joint portion 51) as indicated by the broken line in FIG. 21.

The inflator 31 may also be arranged in the upper part of the lower inflation portion 56 (near the lower part of the inner joint portion 51) or in the right coupling portion 62, as indicated by the long dashed double-short dashed lines in FIG. 21.

In the third embodiment, due to the modification of the shape of the inner joint portion 84, a coupling portion 62 may be provided on the right side of the inner joint portion 84 in place of the left coupling portion 61, and the inflator 31 may be arranged in the coupling portion 62.

When the inflator 31 is arranged to extend in the left-right direction, the gas outlet 33 may be arranged either on the right or left of the main body 32. When the inflator 31 is arranged to extend in the up-down direction, the gas outlet 33 may be arranged either above or below the main body 32.

<Regarding Inner Joint Portion 51>

The vertical joint portions 54, 55 of the inner joint portion 51 of the first embodiment may be omitted.

Also, in this case, one or more additional lateral joint portions may be provided between the lateral joint portions 52, 53. Like the other lateral joint portions 52, 53, the additional lateral joint portions extend in the vehicle width direction and join the front fabric portion 36 and the rear fabric portion 41 such that these fabric portions 36, 41 contact each other.

<Regarding Upper Inflation Portion 57>

The upper inflation portion 57 may be elongated downward as compared with the above embodiments. This configuration allows the upper inflation portion 57 to protect, from an impact, parts of the body of the occupant P3 in the rear seat 14 below the head PH, for example, the thorax region, in addition to the head PH.

As indicated by the solid lines in FIG. 19, inward folding (also referred to as folding at the middle) along folding lines 92, which extend perpendicular to the sheet of the drawing, may be performed such that an upper part 57a, which includes the upper end of the upper inflation portion 57, is located inside a lower part 57b, which is located below the upper part 57a.

The inward folding causes the upper part 57a of the upper inflation portion 57 to overlap with the lower part 57b in the front-rear direction, and the dimension in the up-down direction of the upper inflation portion 57 becomes smaller than before the inward folding.

In addition, if the upper inflation portion 57 is folded by inward folding as described above, the upper inflation portion 57 is easily unfolded as compared with a case in which the upper inflation portion 57 is folded by other methods. Although not illustrated, if the upper inflation portion 57 is folded such that the upper part 57a is located outside the lower part 57b, the upper part 57a is inflated so that the upper inflation portion 57 is unfolded after the inflation gas reaches the upper part 57a from the lower part 57b. However, in the case in which inward folding is performed as indicated by the solid lines in FIG. 19, the inflation gas starts acting on the upper part 57a at an early stage since the upper part 57a is located inside the lower part 57b. The upper part 57a is then pushed out from the lower part 57b as indicated by the long dashed double-short dashed lines in FIG. 19, so that the upper part 57a is unfolded at an early stage. This unfolding action allows the upper part 57a of the upper inflation portion 57 to be deployed quickly.

As shown in FIG. 20A, a bend assisting portion 93 may be provided at the middle portion in the up-down direction of the upper inflation portion 57. The bend assisting portion 93 assists the upper inflation portion 57 in bending forward when inflated.

More specifically, in the above modification, the dimension in the up-down direction of the rear fabric portion 41 of the upper inflation portion 57 is set longer than the dimension in the same direction of the front fabric portion 36.

A pair of upper and lower tethers 94, 95 is provided between the front fabric portion 36 and the rear fabric portion 41 of the upper inflation portion 57. Each of the tethers 94, 95 is constituted by a belt-shaped fabric sheet 96, which extends in the vehicle width direction between the front fabric portion 36 and the rear fabric portion 41. In the modification of FIG. 20A, the fabric sheet 96 is constituted by a pair of front and rear fabric pieces 97, which are joined to each other. However, the fabric sheet 96 may be constituted by a single fabric piece or more than two fabric pieces.

The front edge of the upper tether 94 and the front edge of the lower tether 95 are joined to the front fabric portion 36 by a common joint portion 98, which extends in the vehicle width direction. The rear edge of the upper tether 94 is joined to the rear fabric portion 41 by the joint portion 101, which extends in the vehicle width direction. The rear edge of the lower tether 95 is joined to a part of the rear fabric portion 41 that is separated downward from the joint portion 101 by the joint portion 102, which extends in the vehicle width direction. The joining by the joint portions 98, 101, 102 allows the tethers 94, 95 to bridge the front fabric portion 36 and the rear fabric portion 41 of the upper inflation portion 57.

The tethers 94, 95 each have holes (not shown) through which inflation gas can pass through the tethers 94, 95.

The part of the rear fabric portion 41 located between the joint portions 101, 102 constitutes a slack portion 103. The front fabric portion 36 has no portion that corresponds to the slack portion 103. The tethers 94, 95 and the slack portion 103 constitute the bend assisting portion 93.

In the above-described modification, when the upper inflation portion 57 is deployed and inflated, the bend assisting portion 93 is also deployed and inflated as shown in FIG. 20B. Along with the deployment and inflation of the bend assisting portion 93, the tethers 94, 95 are pulled in the front-rear direction and taut. In the rear fabric portion 41, the slack portion 103 is pulled in the up-down direction and taut. The angle formed by the upper tether 94 with respect to the lower tether 95 is larger than that before the inflation of the bend assisting portion 93. The upper portion 104 above the bend assisting portion 93 in the upper inflation portion 57 is bent forward relative to the lower portion 105. The headrest 17 is located in front of the upper inflation portion 57, which is projected from covering 26 (see FIG. 4). Since the upper inflation portion 57 is bent in the above-described manner, the upper portion 104 approaches the headrest 17 as compared with a case in which the upper inflation portion 57 is not bent. This reduces the distance between the upper portion 104 and the headrest 17.

Thus, when an impact is applied to the vehicle 10 and the upper body of the occupant P3 is inclined forward, the upper portion 104 of the upper inflation portion 57 is pushed forward by the head PH, but is restricted from moving forward by the headrest 17. By being bent forward, the upper portion 104 is restricted from moving at an earlier time than when the upper portion 104 is not bent. The upper body of the occupant P3, which receives a forward inclining force, starts being restrained at an earlier time. This enables early protection of the upper body of the occupant P3.

<Regarding Coupling Portions 61, 62>

In the first to third embodiments, a coupling portion may be provided in the intermediate portion in addition to or in place of the coupling portions 61, 62, which are between the lower inflation portion 56 and the upper inflation portion 57 and on the outer sides in the vehicle width direction.

<Regarding Non-Inflation Portion 63>

A cutout portion 107 as shown in FIG. 21 may be formed in the non-inflation portion 63 in the first embodiment. Although not shown, a similar cutout portion may be formed in the non-inflation portion 63 in the third embodiment.

<Regarding Controller 66>

The controller 66 may output an activation signal to the inflator 31 when predicting that an impact from the front will be applied to the vehicle 10.

<Regarding Tethers 71, 72>

One or more tethers may be added between the tethers 71, 72 in the second embodiment. Like the other tethers 71 and 72, the additional tethers extend in the vehicle width direction between the front fabric portion 36 and the rear fabric portion 41 and bridge the front fabric portion 36 and the rear fabric portion 41.

<Other Modifications>

A vent hole may be provided for discharging the inflation gas to the outside from the interior of the upper inflation portion 57.

For example, as shown in FIG. 21, the front fabric portion 36 and the rear fabric portion 41, which are joined together by the peripheral joint portion 45, may be disjoined from each other in the upper end of the upper inflation portion 57. In this case, the disjoined part in the peripheral joint portion 45 constitutes a vent hole 111. The vent hole 111 allows the interior of the upper inflation portion 57 to communicate with the exterior, so that the inflation gas in the upper inflation portion 57 is discharged upward through between the upper end of the front fabric portion 36 and the upper end of the rear fabric portion 41.

Also, as indicated by the long dashed double-short dashed lines in FIG. 21, vent holes 112 may be constituted by holes provided in the upper portion of the front fabric portion 36. In this case, the vent holes 112 allow the interior of the upper inflation portion 57 to communicate with the exterior, so that the inflation gas in the upper inflation portion 57 is discharged forward through the vent holes 112. Although multiple vent holes 112 are illustrated in FIG. 21, only one vent hole 112 may be provided. Alternatively, vent holes 112 may be provided in the upper portion of the rear fabric portion 41.

The above described airbag apparatuses may be employed in a vehicle having three or more rows of seats.

Vehicles in which the above described airbag apparatuses can be employed include various industrial vehicles in addition to private cars.

The above-described airbag apparatuses can be employed as airbag apparatuses that are mounted on conveyances other than vehicles, for example, aircrafts, boats, and ships that have two or more rows of seats and protect occupants seated in the rear seat from impacts.

The invention claimed is:

1. An airbag apparatus comprising:
   an inflator, which discharges inflation gas; and
   an airbag, which is arranged inside a seat back of a front seat that is forward of a rear seat in a conveyance, wherein the inflation gas is supplied to the airbag from the inflator,
   wherein the airbag includes
      a lower inflation portion, which is inflated by the inflation gas only inside a lower part of the seat back of the front seat, and
      an upper inflation portion, which is arranged inside the seat back and above the lower inflation portion, wherein the upper inflation portion is inflated above the lower inflation portion by the inflation gas, breaks a covering, which constitutes an outer shell of the seat back, and is inflated outside the seat back through the broken part of the covering, wherein
   the front seat includes a headrest above the seat back,
   the upper inflation portion breaks the covering at a position rearward of the headrest of the seat back and is inflated outside the seat back through the broken part of the covering, and
   a bend assisting portion is provided at a middle portion in an up-down direction of the upper inflation portion, the bend assisting portion assisting the upper inflation portion in bending forward when inflated.

2. The airbag apparatus according to claim 1, wherein the airbag further includes a coupling portion,
   the coupling portion couples the lower inflation portion and the upper inflation portion to each other so that the inflation portions communicate with each other and is inflated between the lower inflation portion and the upper inflation portion by the inflation gas, and
   a dimension in a front-rear direction of the coupling portion in an inflated state is set to be smaller than a dimension in the front-rear direction of the upper inflation portion in an inflated state and smaller than a dimension in the front-rear direction of the lower inflation portion in an inflated state.

3. The airbag apparatus according to claim 2, wherein
   the airbag includes a front fabric portion and a rear fabric portion, which is arranged behind the front fabric portion,
   the front fabric portion and the rear fabric portion are joined to each other at a joining portion in peripheral edges of the front fabric portion and the rear fabric portion,
   a plurality of lateral joint portions are provided in a region of the front and rear fabric portions that is surrounded by the joining portion, the lateral joint portions being separated in an up-down direction,
   the lateral joint portions extend in a width direction of the front seat and join the front fabric portion and the rear fabric portion so that these fabric portions contact each other,
   the upper inflation portion is constituted by part of the region above an uppermost one of the lateral joint portions,
   the lower inflation portion is constituted by part of the region below a lowermost one of the lateral joint portions, and
   the coupling portion is constituted by part of the region that is outward in the width direction of all the lateral joint portions.

4. The airbag apparatus according to claim 2, wherein
   the airbag includes a front fabric portion and a rear fabric portion, which is arranged behind the front fabric portion,
   the front fabric portion and the rear fabric portion are joined to each other at a joining portion in peripheral edges of the front fabric portion and the rear fabric portion,
   a plurality of tethers are provided in a region of the front and rear fabric portions that is surrounded by the joining portion, the tethers being separated in an up-down direction,
   the tethers extend in a width direction of the front seat between the front fabric portion and the rear fabric portion, thereby bridging the front fabric portion and the rear fabric portion,
   the upper inflation portion is constituted by part of the region above an uppermost one of the tethers,
   the lower inflation portion is constituted by part of the region below a lowermost one of the tethers, and
   the coupling portion is constituted by part of the region that is outward in the width direction of all the tethers.

5. The airbag apparatus according to claim 2, wherein
   the lower inflation portion, the upper inflation portion, and the coupling portion are supplied with inflation gas from a common inflator,
   the inflator includes
      a main body, which generates the inflation gas, and
      a gas outlet, which discharges the inflation gas generated in the main body, and
   the inflator is arranged in the airbag such that at least the gas outlet is located inside the lower inflation portion.

6. The airbag apparatus according to claim 5, wherein
   the main body is arranged in the lower inflation portion so as to extend in a width direction of the front seat, and
   the gas outlet is provided at one end of the main body and is arranged in the lower inflation portion.

7. The airbag apparatus according to claim 5, wherein
   the inflator is arranged such that the main body extends in an up-down direction and the gas outlet is located at a lower end of the main body, at least an upper part of the main body is arranged in the coupling portion, and the gas outlet is arranged in the lower inflation portion.

8. The airbag apparatus according to claim 1, wherein the lower inflation portion and the upper inflation portion are independent of each other, the inflator includes
- a main body, which generates the inflation gas, and
- a gas outlet, which discharges the inflation gas generated in the main body, the inflator is arranged at a position separated from the lower inflation portion and the upper inflation portion, an upper guide portion is provided between the gas outlet and the upper inflation portion, the upper guide portion guiding some of the inflation gas discharged from the gas outlet to the upper inflation portion, and a lower guide portion is provided between the gas outlet and the lower inflation portion, the lower guide portion guiding, to the lower inflation portion, some of the inflation gas discharged from the gas outlet the amount of which is greater than that of the inflation gas guided to the upper inflation portion.

9. An airbag apparatus comprising:

an inflator, which discharges inflation gas; and an airbag, which is arranged inside a seat back of a front seat that is forward of a rear seat in a conveyance, wherein the inflation gas is supplied to the airbag from the inflator, wherein the airbag includes
- a lower inflation portion, which is inflated by the inflation gas only inside a lower part of the seat back of the front seat, and
- an upper inflation portion, which is arranged inside the seat back and above the lower inflation portion, wherein the upper inflation portion is inflated above the lower inflation portion by the inflation gas, breaks a covering, which constitutes an outer shell of the seat back, and is inflated outside the seat back through the broken part of the covering, wherein the airbag further includes a coupling portion, the coupling portion couples the lower inflation portion and the upper inflation portion to each other so that the inflation portions communicate with each other and is inflated between the lower inflation portion and the upper inflation portion by the inflation gas, a dimension in a front-rear direction of the coupling portion in an inflated state is set to be smaller than a dimension in the front-rear direction of the upper inflation portion in an inflated state and smaller than a dimension in the front-rear direction of the lower inflation portion in an inflated state, the airbag includes a front fabric portion and a rear fabric portion, which is arranged behind the front fabric portion, the front fabric portion and the rear fabric portion are joined to each other at a joining portion in peripheral edges of the front fabric portion and the rear fabric portion, a plurality of tethers are provided in a region of the front and rear fabric portions that is surrounded by the joining portion, the tethers being separated in an up-down direction, the tethers extend in a width direction of the front seat between the front fabric portion and the rear fabric portion, thereby bridging the front fabric portion and the rear fabric portion, the upper inflation portion is constituted by part of the region above an uppermost one of the tethers, the lower inflation portion is constituted by part of the region below a lowermost one of the tethers, and the coupling portion is constituted by part of the region that is outward in the width direction of all the tethers.

10. An airbag apparatus comprising:

an inflator, which discharges inflation gas; and an airbag, which is arranged inside a seat back of a front seat that is forward of a rear seat in a conveyance, wherein the inflation gas is supplied to the airbag from the inflator, wherein the airbag includes
- a lower inflation portion, which is inflated by the inflation gas only inside a lower part of the seat back of the front seat, and
- an upper inflation portion, which is arranged inside the seat back and above the lower inflation portion, wherein the upper inflation portion is inflated above the lower inflation portion by the inflation gas, breaks a covering, which constitutes an outer shell of the seat back, and is inflated outside the seat back through the broken part of the covering, wherein the airbag further includes a coupling portion, the coupling portion couples the lower inflation portion and the upper inflation portion to each other so that the inflation portions communicate with each other and is inflated between the lower inflation portion and the upper inflation portion by the inflation gas, a dimension in a front-rear direction of the coupling portion in an inflated state is set to be smaller than a dimension in the front-rear direction of the upper inflation portion in an inflated state and smaller than a dimension in the front-rear direction of the lower inflation portion in an inflated state, the lower inflation portion, the upper inflation portion, and the coupling portion are supplied with inflation gas from a common inflator, the inflator includes
- a main body, which generates the inflation gas, and
- a gas outlet, which discharges the inflation gas generated in the main body, the inflator is arranged in the airbag such that at least the gas outlet is located inside the lower inflation portion, the inflator is arranged such that the main body extends in an up-down direction and the gas outlet is located at a lower end of the main body, at least an upper part of the main body is arranged in the coupling portion, and the gas outlet is arranged in the lower inflation portion.

* * * * *